(12) United States Patent
Takigawa

(10) Patent No.: US 6,178,726 B1
(45) Date of Patent: Jan. 30, 2001

(54) METHOD OF CONTROLLING END SEAL TIME IN BAG-MAKING, FILLING AND PACKAGING MACHINE

(75) Inventor: Sadaomi Takigawa, Soka (JP)

(73) Assignee: Kawashima Packaging Machinery Ltd., Soka (JP)

( * ) Notice: Under 35 U.S.C. 154(b), the term of this patent shall be extended for 0 days.

(21) Appl. No.: 09/214,733

(22) PCT Filed: Apr. 22, 1998

(86) PCT No.: PCT/JP98/01849

§ 371 Date: Dec. 23, 1998

§ 102(e) Date: Dec. 23, 1998

(87) PCT Pub. No.: WO98/49060

PCT Pub. Date: Nov. 5, 1998

(30) Foreign Application Priority Data

Apr. 25, 1997 (JP) .................................................. 9-121518

(51) Int. Cl.[7] .............................. B65B 9/20; B65B 57/00
(52) U.S. Cl. ................................ 53/451; 53/551; 53/552; 53/374.6; 53/75
(58) Field of Search .............................. 53/75, 551, 552, 53/374.3, 374.4, 374.6

(56) References Cited

U.S. PATENT DOCUMENTS

| | | | |
|---|---|---|---|
| 5,279,098 | * | 1/1994 | Fukuda ................................... 53/551 |
| 5,347,795 | * | 9/1994 | Fukuda ................................. 53/373.7 |
| 5,412,927 | * | 5/1995 | Miyazaki et al. ..................... 53/374.3 |
| 5,753,067 | * | 5/1998 | Fukuda et al. .......................... 53/552 |

FOREIGN PATENT DOCUMENTS

| | | |
|---|---|---|
| 56214/96 | * 1/1997 | (AU) . |
| 58-195101 | 11/1983 | (JP) . |
| 61-190409 | 8/1986 | (JP) . |
| 61-244708 | 10/1986 | (JP) . |
| 4-87931 | 3/1992 | (JP) . |
| 05330504 | 12/1993 | (JP) . |
| 8-175524 | 7/1996 | (JP) . |
| 09012003 | 1/1997 | (JP) . |
| 9-175514 | 7/1997 | (JP) . |

\* cited by examiner

*Primary Examiner*—John Sipos
(74) *Attorney, Agent, or Firm*—Armstrong, Westerman, Hattori, McLeland & Naughton

(57) ABSTRACT

An object of the present invention is to provide a control method for a box motion type end-sealing carried out by a longitudinal type or lateral type bag forming, filling and packaging machine, which can permit the end sealing time period to be set as long as possible even if a linear section (a sealing length of a predetermined stroke) is made constant. There is provided a method of controlling an end-sealing time period for a bag forming, filling and packaging machine. A packaging film is longitudinally sealed at its both film edges to provide a packaging cylinder, a film feeding device feeds the packaging cylinder downwardly and a box-motion type end-sealing (lateral sealing)/cutting device seals the packaging cylinder at two lateral rows, and cuts an intermediate position between the rows, one row being located at an upper side of a product to be packaged that is filled into the packaging cylinder, and the other row being located at a lower side of a product to be packaged that is to be filled into the packaging cylinder subsequently. The method is characterized in that servo-motors for forming box motion are controlled so that a sealing time period in a sealing distance of a predetermined stroke is controlled to be relatively longer. That is, during the box motion, the end-sealing heater is moved in a linear section slowly as long as possible, and moved relatively quickly in a returning section.

6 Claims, 29 Drawing Sheets

METHOD OF CONTROLLING END SEAL TIME IN BAG-MAKING, FILLING AND PACKAGING MACHINE

BACKGROUND OF THE INVENTION

1. Field of the Invention

This invention relates to a method of controlling an end sealing time period as long as possible for a longitudinal-type or a traverse-type bag forming, filling and packaging machine adapted to effect a box-motion type end sealing.

2. Description of the Related Art

A typical longitudinal-type bag forming, filling and packaging machine is constructed as shown in FIG. 1. A packaging film is introduced to a former 9 where the film is folded to wrap about a product filling cylinder 2 and to form a seam at the front side of the former 9. The seam is longitudinally sealed by a longitudinally sealing device 3 or 3' so that the film forms a packaging cylinder H. A film feeding device 4, located at a side of the product filling cylinder 2, pulls the packaging cylinder H downwardly so that the packaging cylinder 2 is located below the product filling cylinder 2. Then, an end-sealing (lateral-sealing)/cutting device 5 effects the end-sealing (lateral-sealing) and the cutting of the packaging cylinder H, so that a packaged product J is discharged. Although this end-sealing may be effected at a fixed position, such an arrangement is available that carries out a box motion as shown by a in order to elongate a sealing time period. The box motion makes it possible to move the end-sealing/cutting device 5 downwardly along a linear segment b in synchronous with the travel of the packaging cylinder without the stoppage of the travel of the packaging cylinder. That is, the sealing with a heater continues during the movement along the line segment b, the sealing time period can be elongated without any stoppage of the travel of the packaging cylinder. The content, such as confectionery, to be filled into the packaging cylinder is delivered downwardly through the product filling cylinder 2 during a return period c of the box motion of the end-sealing.

The operation of the end-sealing (lateral-sealing)/cutting device 5 will be described in detail. At the upper portion d of the linear segment of the box motion a, heaters for the end-sealing (lateral-sealing) are closed toward each other in conformity with a cut position of the packaging cylinder H. Prior to the complete close of the end-sealing heaters, two pairs of opposing shutters are closed to make the packing cylinder flattened. The opposing shutters in each pair are elastically held in such a manner as to protrude toward the mating shutter more closely than the right and left end-sealing heaters do, and the two pairs are respectively arranged at upper and lower sides of the right and left sealing heaters. The end-sealing heaters are thereafter closed completely to seal the packaging cylinder H at two lateral-rows simultaneously, while the cutter cuts the cut position (i.e. an intermediate position between the two lateral-rows). One of the lateral-row is located at the proximity of the upper side of the product to be packaged, which has been fallingly delivered and filled through the product filling cylinder, and the other of the lateral-row is located at the proximity of the lower side of the product to be packaged, which are to be fallingly delivered and filled subsequently.

The above-described box motion type end-sealing/cutting device is designed so that the pair of end-sealing heaters are moved along such loci (i.e. two arcuate loops a) that a pair of cam curves, each being formed by a circle partially cut at its one side with a linear segment, are opposed to the other.

That is, the box motion type end-sealing/cutting device repeatingly makes such symmetrical box motion that a pair of end-sealing heaters are closed to each other to carry out the lateral two row sealing while being moved downwardly, and subsequently open widely while being returningly moved upwardly so as not to interfere with the product to be packaged after the cutter cuts the packaging cylinder at the cut position between the sealed lateral two rows. The two pairs of shutters, additionally provided to the box motion type end-sealing/cutting device, are not special ones, that is, they have the same structure as two pair of shutters additionally provided to a conventional end-sealing/cutting device which is not the box motion type device. The shutters simply function to be closed to each other and to make the packaging cylinder flattened prior to the complete close of the pair of the end-sealing heaters when the end-sealing/cutting device 5 makes the box motion to close the pair of end-sealing heaters.

The longitudinal type bag forming, filling and packaging machine suffers from a possibility that a packaging error occurs to bite a product to be packaged when the lateral-sealing is carried out by the pair of end-sealing (lateral-sealing) heaters since the product to be packaged may become bulky in a height direction or rebounded up after being fallen down. For this reason, the end-sealing/cutting device is additionally provided with a product-biting preventive device equipped with a pair of stripping plates, so that the pair of stripping plates strip the packaging cylinder over an area from the upper side to the lower side of the cut position to forcibly push the product to be packaged when the pair of the end-sealing heaters are open. Japanese Patent Application Laid-Open No. Sho. 58-195101, U.S. Pat. No. 5,203,145, U.S. Pat. No. 4,947,618, U.S. Pat. No. 4,663,917, Japanese Patent Application Laid-Open No. Hei. 5-330504, Japanese Patent Application Laid-Open No. Hei. 9-12003 and so on relate to product-biting preventive devices of end-sealing/cutting devices in conventional longitudinal type bag forming, filling and packaging machines. The operation of the box motion slightly differs depending on the structure of the above-noted stripping plates.

Japanese Patent Application Laid-Open No. Hei. 5-330504 discloses an example of the product-biting preventive device of this type as a proposal of an assignee of this application. The disclosed product-biting preventive device for a longitudinal type bag forming, filling and packaging machine equipped with a box-motion type end-sealing (lateral-sealing)/cutting device as described in Japanese Patent Application Laid-Open No. Hei. 5-330504 will be described with reference to FIG. 19. In the box-motion type end-sealing/cutting device, a pair of end-sealing (lateral-sealing) heaters 5a and 5b make a pair of symmetrical box motions (m1 and m2) restricted by curved cam lines. The product-biting preventive device is arranged so that it is separated from the end-sealing/cutting device, and that a pair of stripping plates make a pair of symmetrical and longitudinally elongated box motions (m3 and m4) restricted by two slide strokes. When the pair of end-sealing heaters 5a and 5b are returningly moved upwardly while being open widely, the pair of stripping plates 6a and 6b are moved upwardly in the vicinities of the insides of the pair of end-sealing heaters 5a and 5b while remaining open and then moved closer to each other to such a degree as to flatten the packaging cylindrical but not to clamp the packaging cylinder. When the pair of end-sealing heaters 5a and 5b are moved closer to each other while being moved downwardly from the upper, returned position, the pair of stripping plates 6a and 6b are moved downwardly so as not to interference with the end-sealing heaters, that is, the pair of stripping plates 6a and 6b make such a stripping motion as to forcibly push the product to be packaged below the cut position of the packaging plate by transferring the flattened position of the packaging cylinder from the upper side of the cut position to the lower side thereof. Then, the pair of stripping plates 6a and 6b and the pairs of shutters 7a and 7b are closed to flatten and clamp the packaging cylinder, the pair of end-sealing heaters 5a and 5b are closed to seal the packaging cylinder at two lateral-rows in the vicinities of upper and lower sides of the sealed position thereof, and the cutter 5c cut the packaging cylinder at the cut position. The pair of end-sealing heaters 5a and 5b, after moving a predetermined amount downwardly, are moved away from each other and then returningly moved upwardly.

The configuration of the cam for causing this box motion is shown in FIG. 21(b) which is the same as the configuration of the cam for causing a box motion in a conventional case where the stripping plates 6a and 6b are not provided. In the figure, the end heater starts the sealing at I, and completes the sealing at II. The section from I to II is a sealing section. Through the outer circumferential section from II to I, the end heater is returned to the sealing start point I.

FIG. 20 shows steps for explaining a correlation between the end-sealing/cutting device and a packaging cylinder flattening device in the above-described machine. Positions of end heaters 5a and 5b, a push cutter 5c, shutters 7a and 7b, swing fingers 64a and 64b and stripping bars 6a and 6b are changed in order of steps (a), (b), (c), (d), (e) and (f) in a circulated manner. In the step (a), the reference character m1 and m2 denote box motion loci depicted by clamp surfaces of the end heaters 5a and 5b; m3, m4, box motion loci depicted by the stripping bars 6a and 6b caused by swinging and upward and downward movement of the swinging fingers 64a and 64b; and p, a box motion locus depicted by the rear end portion of the push cutter 11. In the step (a), the end heaters 5a and 5b moving upwardly are open and on the mid-points of the ascending stroke, and the swinging fingers 64a and 64b are moved upwardly while remaining open so that the stripping bars 6a and 6b are passed in the proximity of the inside of the end heaters 5a and 5b and positioned slightly above the shutters 7a and 7b. In the step (b), the swinging fingers 64a and 64b are located at upper portions where the two stripping bars 6a and 6b clamp and flatten the packaging cylinder, and the end heaters 5a and 5b are open at upper positions. In the step (c), the stripping bars 6a and 6b clamping the packaging cylinder are moved downwardly to the substantially mid-points of the descending stroke at a speed much larger than a film feeding speed. In this step, air is introduced into the bag, and the product to be packaged, which is fallingly filled and occupies in the upper positions, is stripped and fallen downwardly, and thereafter the shutters 7a and 7b are closed so that the shutters 7a and 7b in cooperation with the stripping bars 6a and 6b ensures the flatness of the end-sealing portion of the packaging cylinder. Further, the end heaters 5a and 5b are closed at positions in conformity with a register mark printed on the packaging film to start the two-lateral-row sealing. After the shutters 7a and 7b have been closed, the product to be packaged subsequently is supplied above the shutters 7a and 7b. In the step (d), the shutters 7a and 7b, the end heaters 5a and 5b and the stripping bars 6a and 6b, which are all closed, are moved downwardly, and when the end heaters 5a and 5b are located at the substantially mid-points of the descending stroke, the push cutter 5c cuts a portion of the packaging cylinder between the two-lateral-row sealed portions. In the step (e), the shutters 7a and 7b, the end heaters 5a and 5b, and the stripping bars 6a and 6b, which all remain closed, reach the descended positions, and the push cutter 5c has already completed the push cutting and retracted. In the step (f), the shutters 7a and 7b, the end heaters 5a and 5b, and the stripping bars 6a and 6b are open to be returningly moved upwardly.

Next, a problem encountered in the art will be described with reference to FIG. 2 by describing an operation of the longitudinal type bag forming, filling and packaging machine disclosed by the Japanese Patent Application Laid-Open No. 9-12003 by way of example. FIG. 2 is a longitudinally sectional view.

The box motion, as depicted by curved cam lines m1 and m2 in FIG. 2, is created such that cam engagement followers of swinging levers 17 and 18 follow the curved cam lines m1 and m2 provided on circular plates rotated by rotating motion of a motor. The longer linear section (b in FIG. 1) of the box motion is more advantageous since the longer sealing time period can be ensured, but on the other hand, the longer linear section (the longer stroke) requires more volume of mechanical portions associated therewith and suffers from a likelihood of the mechanical vibration generated when the stroke is changed from the linear motion to the circular motion or vice versa. That is, the length of the stroke has an upper limit and thus the sealing time period has an upper limit.

SUMMARY OF THE INVENTION

An object of the present invention is to provide a control method for the box motion type end-sealing carried out by a longitudinal type or lateral type bag forming, filling and packaging machine, which can permits the end sealing time period to be set as long as possible even if the above-mentioned linear section (the sealing length of a predetermined stroke) is made constant.

The present invention provides a method of controlling an end-sealing time period for a bag forming, filling and packaging machine. A packaging film is longitudinally sealed at its both film edges to provide a packaging cylinder, a film feeding device feeds the packaging cylinder downwardly and a box-motion type end-sealing/cutting device seals the packaging cylinder at two-lateral rows, and cuts an intermediate position between the rows, one row being located at an upper side of a product to be packaged that is filled into the packaging cylinder, and the other row being located at an lower side of a product to be packaged that is to be filled into the packaging cylinder subsequently. The method characterized in that servo-motors for forming box motion are controlled so that a sealing time period in a sealing distance of a predetermined stroke and during one cycle of a predetermined time period is controlled to be relatively longer. That is, during the box motion a in FIG. 1, the end-sealing heater is moved in a linear section b slowly to spend the time period as long as possible, and moved relatively quickly in a returning section c so that the total time period for one cycle is unchanged.

DETAILED DESCRIPTION OF THE PREFERRED EMBODIMENTS

The basic operation of a box-motion type end-sealing/cutting device in a longitudinal bag forming, filling and packaging machine according to an embodiment of the present invention will be briefly described with reference to FIGS. 2 to 9.

The longitudinal type bag forming, filling and packaging machine embodying this invention is operated in the following manner similarly to one that is described in the Japanese Patent Application Laid-Open No. Hei. 9-12003. Note that the control method of the end-sealing time period according to the present invention can also be applied to the box-motion of the type that is disclosed in the Japanese Patent Application Laid-Open No. Hei. 5-330504 (described later).

Figure 1:
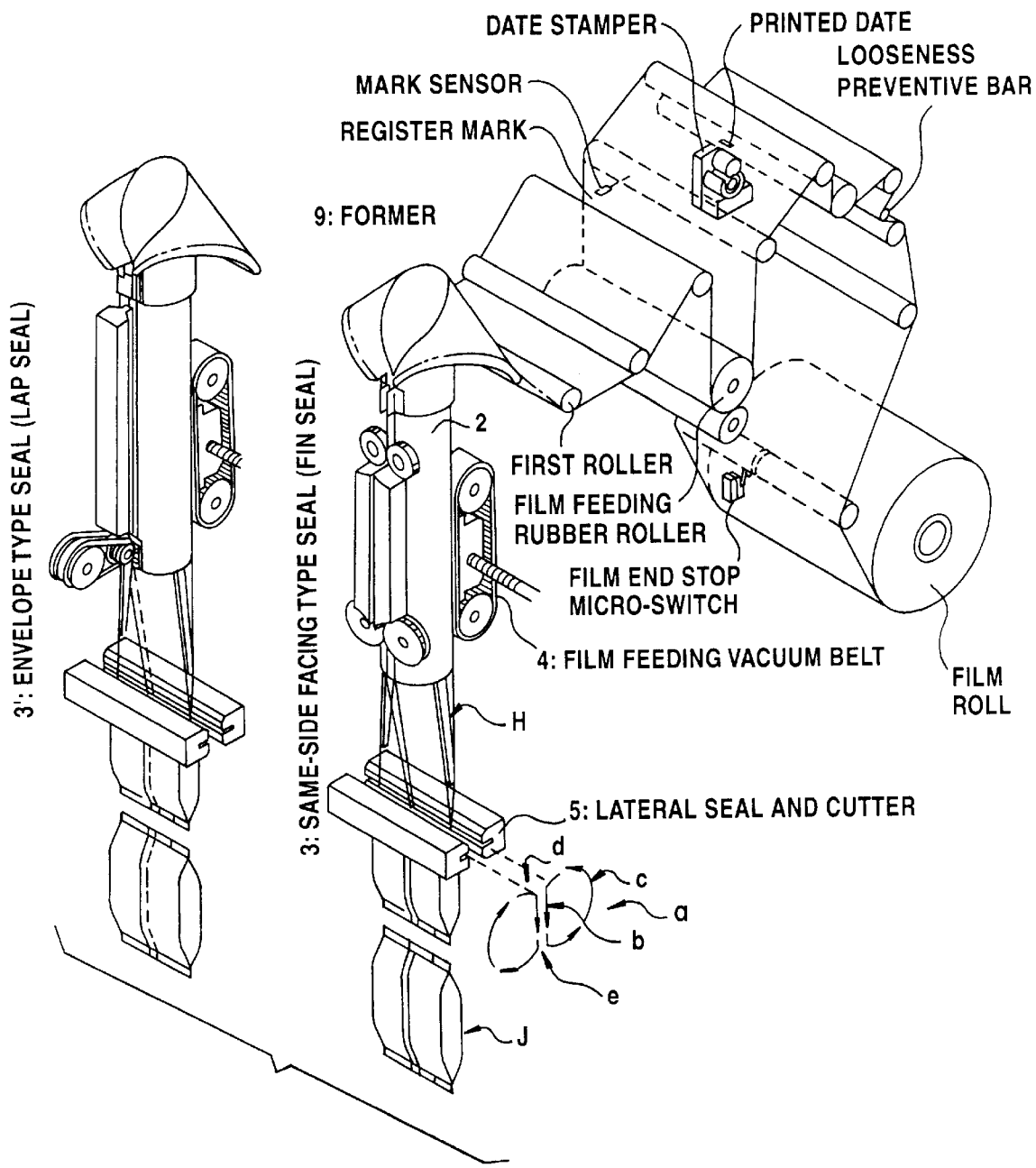
FIG. 1 is a perspective view showing an entire structure of a longitudinal type bag forming, filling and packaging machine to which the present invention is applied.
Figure 2:
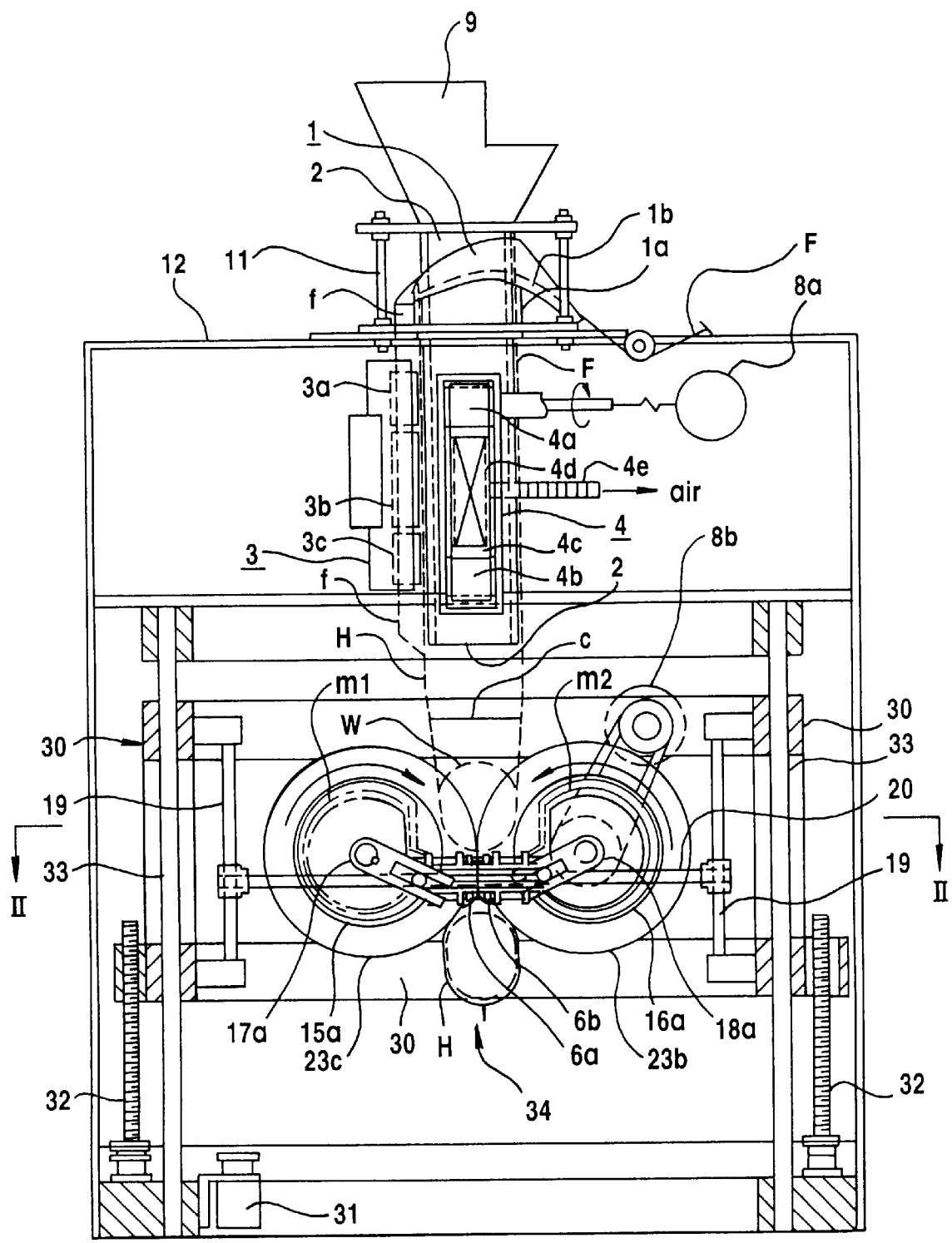
FIG. 2 is a longitudinally sectional view of the longitudinal type bag forming, filling and packaging machine to which the present invention is applied.
Figure 3:
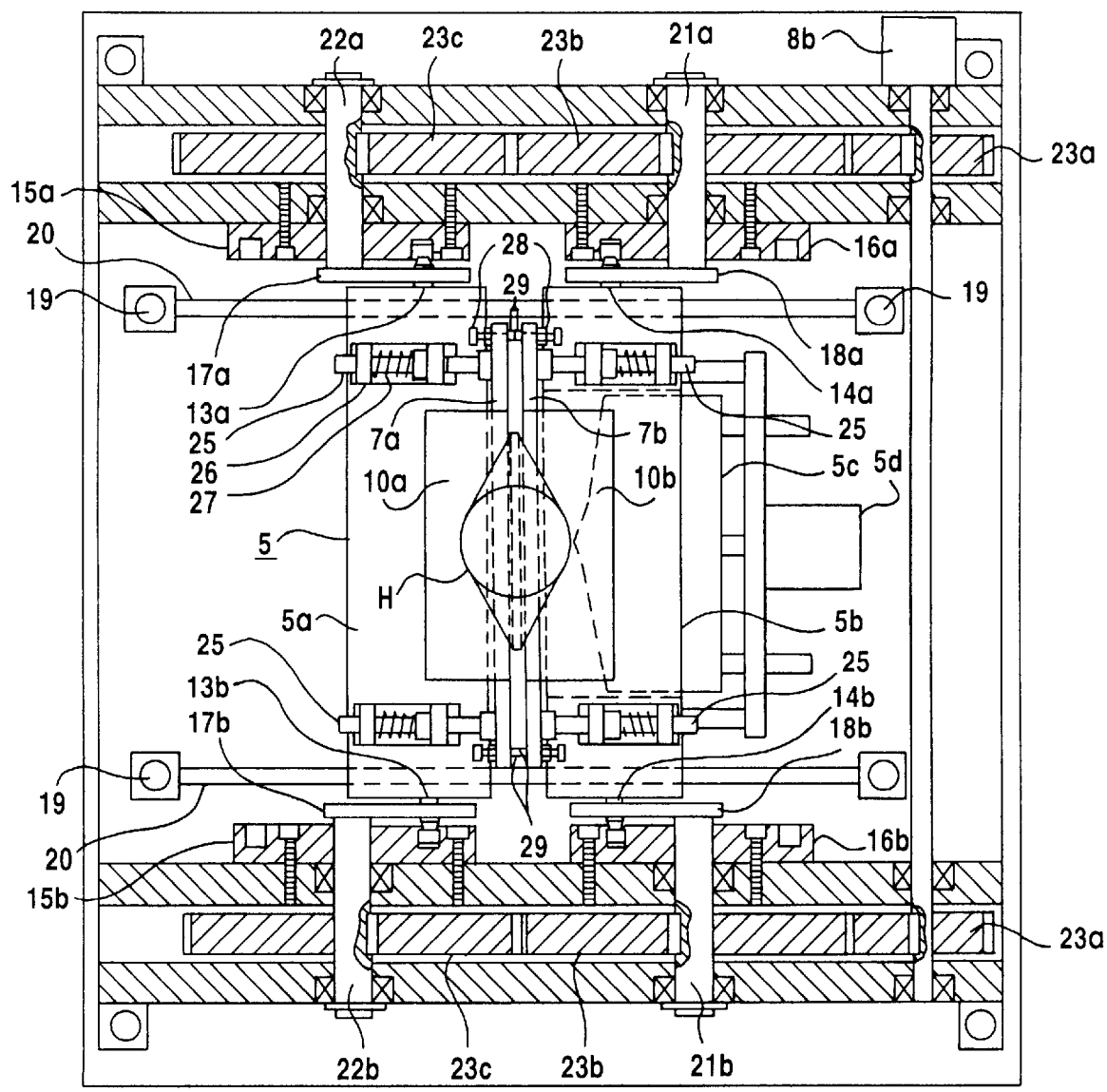
FIG. 3 is a longitudinally cross-sectional view of the longitudinal type bag forming, filling and packaging machine to which the present invention is applied.
Figure 21B:
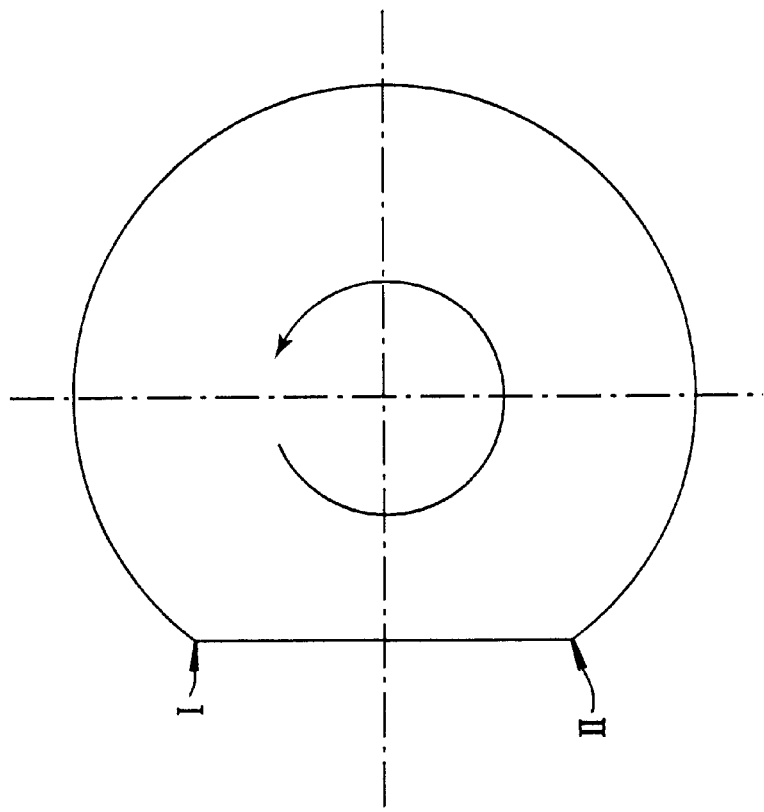
FIG. 21 shows cam configurations used in the longitudinal type bag forming, filling and packaging machine provided with the box motion type end-sealing/cutting device, to which the present invention is applied.
Figure 21A:
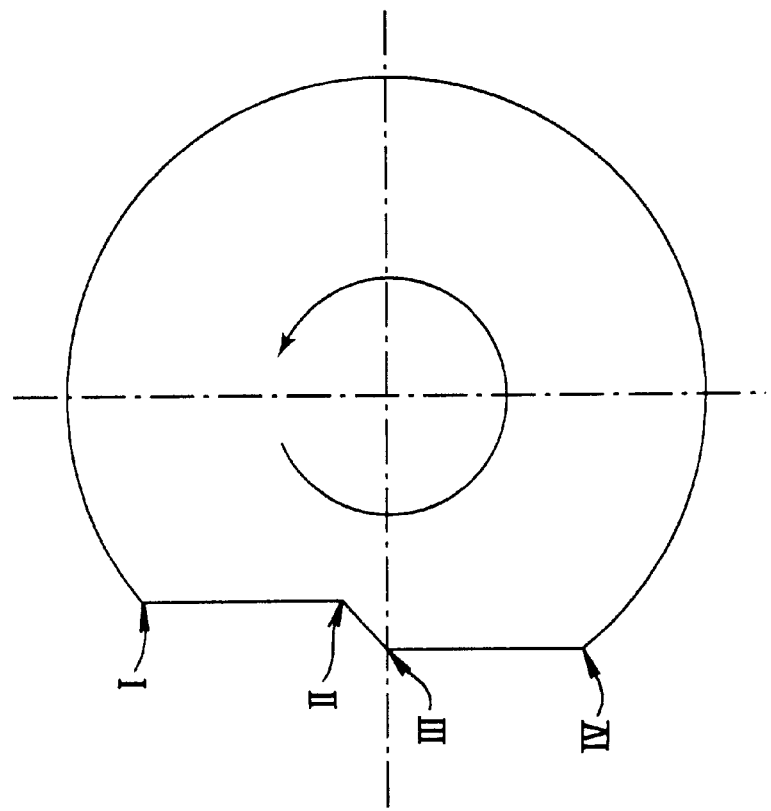

As shown in FIGS. 1 to 3, a packaging film F is folded to enclose a product filling cylinder 2, and the both film edges are sealed longitudinally by a longitudinal sealing device 3 to provide a packaging cylinder H. The packaging cylinder H is pulled downwardly by a film feeding device 4 provided at the side face of the product filling cylinder 2 so that the packaging cylinder H is suspended below the product filling cylinder 2. Concurrently, the box motion is started by the aid of the pair of curved cam lines m1 and m2 (see FIG. 2), so that a pair of end-sealing (lateral-sealing) heaters 5a and 5b are closed while being moved downwardly to apply the two lateral-row seals. During the end-sealing, the packaging cylinder H suspended downwardly along the product filling cylinder 2 is cut by an end-sealing/cutting device 5 at the position between the two lateral-row seals (the cut position c). Then, the end-sealing heaters 5a and 5b are open and returningly moved upwardly. The configuration of the cam, which causes this box motion, is shown in FIG. 21(a). In FIG. 21(a), the stripping starts at the point I, and is completed at the point II. That is, a stripping section is defined between the points I and II. Subsequently, the sealing by the end heaters starts at the point III, and is completed at the point IV. This section between the points III and IV is a sealing section. Through the outer circumferential section IV to I, the status is returned to the stripping start point I.

The operation step from the time point at which the end-sealing heaters 5a and 5b are returned to the most ascended position after they complete the end-sealing and are open, to the time point at which they starts the end-sealing after they are moved downwardly while approaching each other, can be divided into first, second and third motion stages. In the first motion stage, a pair of stripping plates 6a and 6b, which are elastically held horizontally and in parallel to the lower surfaces of the pair of end-sealing heaters 5a and 5b, are moved closer to each other from their open state to flatten the packaging cylinder H but permit the passage of the packaging cylinder H therebetween, whereas the pair of the end-sealing heaters 5a and 5b are moved closer to each other from their open state to such a degree that the end-sealing heaters 5a and 5b are not in contact with the packaging cylinder H thus flattened. Further, when the pair of the stripping plates 6a and 6b are moved closer to each other, the feeding of the packaging cylinder H is speed-reduced or stopped so that a cut position C of the packaging cylinder H is located below from the stripping plates 6a and 6b at a predetermined amount. In the second motion stage, the end-sealing/cutting device 5 is moved downwardly at a relatively large descending speed with respect to the packaging cylinder H while the pair of the stripping plates 6a and 6b and the pair of end-sealing heaters 5a and 5b maintain their respective closed states, so that a cutter 5c of the end-sealing/cutting device 5 mutually approaches the cut position C of the packaging cylinder H. In the third motion stage, the descending speed of the packaging cylinder H is increased while the descending speed of the end-sealing/cutting device 5 is changed, or at least the descending speed of the packaging cylinder H is increased to synchronize the descending speed of the packaging cylinder H with the descending speed of the pair of end-sealing heaters 5a and 5b. When the cut position C of the packaging cylinder H reaches the end-sealing start position, the speed synchronization is completed and the cutter 5c of the end-sealing/cutting device 5 is coincident for location with the cut position of the packaging cylinder H.

The detailed description will be further given below.

FIGS. 2 and 3 show the longitudinal type bag forming, filling and packaging machine which adopts a product biting preventive method for the box-motion type end-sealing (lateral sealing)/cutting device. FIG. 3 is a laterally cross-sectional view taken along the arrowed line II—II of FIG. 2. As shown in FIGS. 2 and 3, this longitudinal type bag forming, filling and packaging machine is designed such that a hopper 9 is provided on the upper end of the product filling cylinder 2, a cylinder portion 1a of a bag forming device 1 circumscribes the upper portion of the product filling cylinder 2, the longitudinal-sealing device 3 is provided in front of the product filling cylinder 2, and the film feeding device 4 is located on both sides of the product filling cylinder 2. The box-motion type end-sealing/cutting device 5 having the pair of end-sealing heaters 5a and 5b and the cutter 5c is provided below the product filling cylinder 2. The pair of the stripping plates 6a and 6b and the pair of the shutter plates 7a and 7b are respectively provided above and below the pair of the end-sealing heaters 5a and 5b. Receptacle plates 10a and 10b are additionally provided on the pair of the shutter plates 7a and 7b.

As shown in FIG. 2, the product filling cylinder 2 is supported at an upper flange portion thereof through brackets 11 by the upper surface of a machine frame 12. The product filling cylinder 2 serves to fill the packaging cylinder H with the product to be packaged such that the product intermittently fallen and supplied at a predetermined quantity is passed through the inside thereof. The bag forming device 1 includes the cylinder portion 1a having a longitudinal slit on the front face thereof, and a collar portion (a former) 1b elongated from the upper edge of the cylinder portion 1a rearwardly of the packaging machine. The cylinder portion 1a circumscribes the product filling cylinder 2 with a uniformly annular clearance of 2 to 3 mm. The collar portion 1b has such a curved surface configuration as to three-dimentionally form the planar packaging film F into a cylindrical shape without any wrinkles at its lower end thereof. The bag forming device 1 guides the continuous strip-like packaging film F, which is introduced from the rear of the packaging machine, to the collar portion 1b so as to introduce the packaging film F from the bent edge to a space between the product filling cylinder 2 and the cylinder portion la in a cylindrical manner. The cylinder portion 1a stabilizes the packaging film F such that the packaging film F has a cylindrical shape and encloses the product filling cylinder 2 to closely contact with the product filling cylinder 2. Both edges f of the packaging film F is passed out of the cylinder through the slit formed on the front side of the cylinder portion 1a so that the edges f are raised up in the rib-like form with respect to the product filling cylinder 2 and the film inner surfaces of the edges f are closely contacted with each other. The longitudinal sealing device 3 is provided on the swinging ends of a horizontally swinging arm 13 that is freely horizontally swingable in front of the product filling cylinder 2. The longitudinally sealing device 3 includes a pair of film pulling-in rollers 3a at its upper stage which clamp and pull-in the both end edges of the packaging film F, a pair of heat rollers 3c at its lower stage which clamp and pull-in the end edges f of the packaging film F at a higher speed, and a pair of rod-like longitudinal heaters 3b at its intermediate stage which slidably clamp the end edge of the packaging film F under tension between the rollers 3a and 3b and apply the continuous longitudinal sealing to the closely contacted end edge of the packaging film F. This arrangement is the same as a longitudinal sealing device disclosed in FIG. 3 of the Japanese Patent Application Laid-Open No. Hei. 5-330504. In addition, the longitudinal sealing may be performed such that the inner surface of one end edge of the packaging film F is overlain on the outer surface of the other end edge of the packaging film F, and a rod-like heater or a roll heater depresses the overlapped seam against the product filling cylinder 2 (envelop type sealing, see FIG. 1). In case of the roll heater, the vacuum function is preferably added to make it possible to feed the packaging film while sucking the film.

As shown in FIG. 2, the film feeding device 4 is provided on each of the both side faces of the product filling cylinder 2 (in case of FIG. 1, it is provided on only a back face thereof). Although the structure of the film feeding device is not directly related to the present invention, one that is provided on the back face as shown in FIG. 1 is used for the continuous feeding of the packaging cylinder, whereas ones that are provided on both side faces as shown in FIG. 2 are used for the intermittent feeding of the same. The film feeding device 4 (or 4 in FIG. 1) is constructed such that a geared belt 4c having suction holes is suspended between upper and lower geared belt wheels 4a and 4b, and a vacuum box 4d, which is connected to a negative pressure generating device through a hose 4e, is located in the inner side of the geared belt 4c so that an opening of the box 4d is confronted with the product filling cylinder 2 through the belt 4c. The upper geared belt wheel 4a on each side is driven by a first servo-motor 8a, and the geared belt 4c on each side is closely contacted with the packaging film F flowing along the other side of the product filling cylinder 2 to feed the film F by the aid of the negative pressure suction of the vacuum box 4b.

Figure 4:
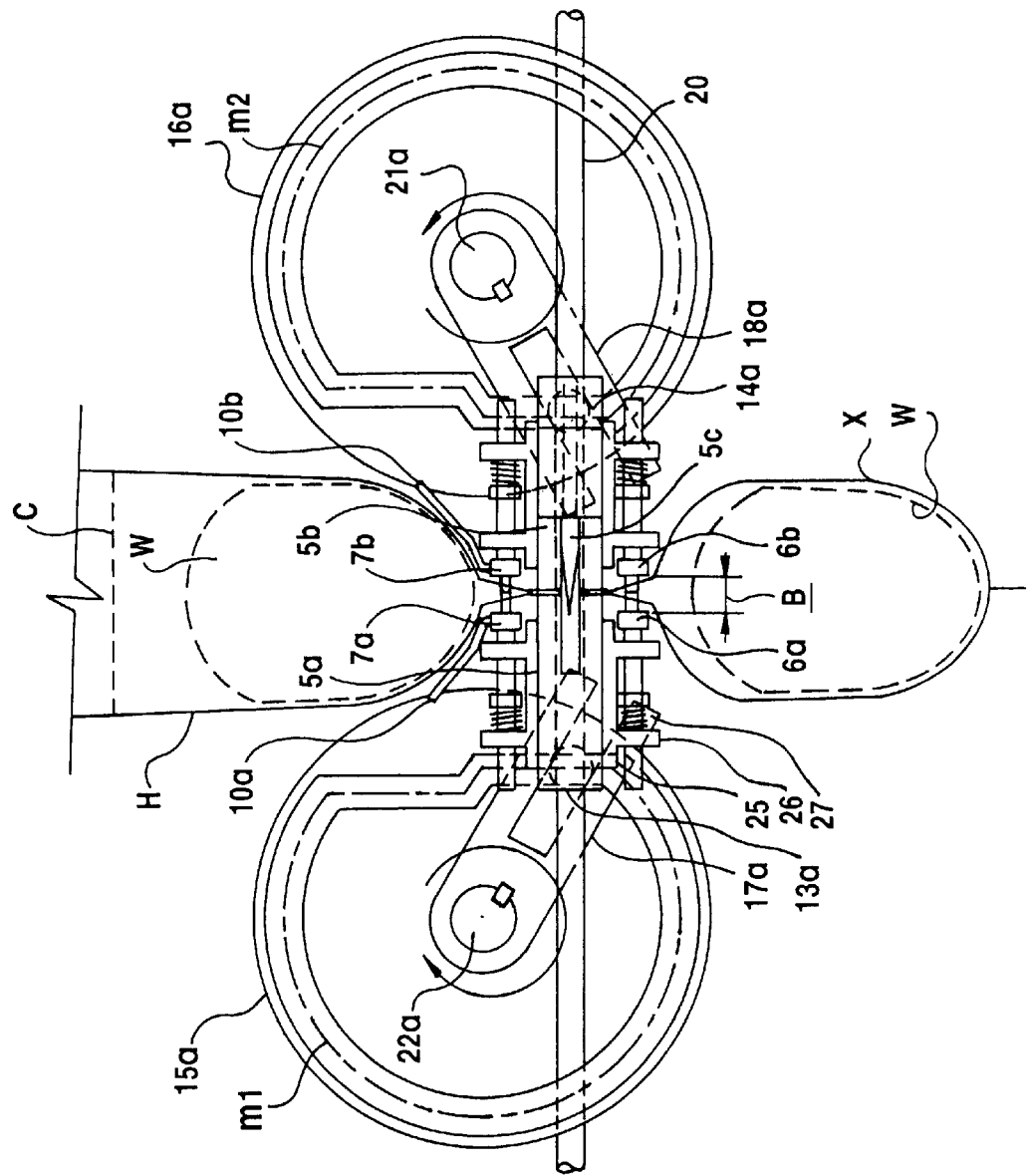
FIG. 4 is an enlarged, laterally partial cross-sectional view of the longitudinal type bag forming, filling and packaging machine to which the present invention is applied.

As shown in FIGS. 2 to 4, the pair of end-sealing (lateral-sealing) heaters 5a and 5b are guided by two horizontal guides 20 and 20 each passing through the corresponding ends of the heaters 5a and 5b so as to be moved closer to and away from each other. Each of the two horizontal guides 20 and 20 is vertically movably guided at its ends by longitudinal guides 19 and 19 provided on an elevator base. FIG. 4 is a partially enlarged view of FIG. 2. The elevator base 34 is guided by guide columns 33, and the height of the elevator base 34 can be adjusted by rotating threaded shafts 32 provided on four corners by a motor 31. Thus, the height position of the end-sealing/cutting device 5 can be adjusted depending on the length of the bag. The end-sealing heater 5a (5b) is engaged through the cam engagement followers 13a and 13b (14a and 14b) at its ends with cam grooves 15a and 15b (16a and 16b) fixedly provided on the machine frame, and the cam engagement followers 13a and 13b (14a and 14b) are respectively engaged with slits formed on the swinging levers 17a and 17b (18a and 18b). Therefore, by rotating the swinging levers 17a, 17b, 18a and 18b, the pair of end-sealing heaters 5a and 5b make the symmetrical box motion. As shown in FIG. 3, the rotation of the swinging levers 18a and 18b are carried out by transmitting rotational toque of a second servo-motor 8b through gears 23a and 23b to shafts 21a and 21b fixedly supporting the swinging levers 18a and 18b. Similarly, the rotation of the swinging levers 17a and 17b are carried out by transmitting rotational torque of the second servo-motor 8b through the gears 23a, 23b and 23c to the shafts 22a and 22b fixedly supporting the swinging levers 17a and 17b. Accordingly, the end-sealing/cutting device 5 is operated in such a manner that the pair of end-sealing heaters 5a and 5b make the symmetrical box motion by the pairs of riceball-like symmetrical curved cam lines m1 and m2 provided on opposite perpendicular planes with respect to the product filling cylinder 2 so as to be closed to each other to clamp the packaging cylinder H and execute the lateral two-row sealing. The cutter 5c is incorporated into the inside of the end sealing heater 5b in the rear side of the packaging machine so as to execute the cutting motion with the aid of an air cylinder 5d.

Figure 5:
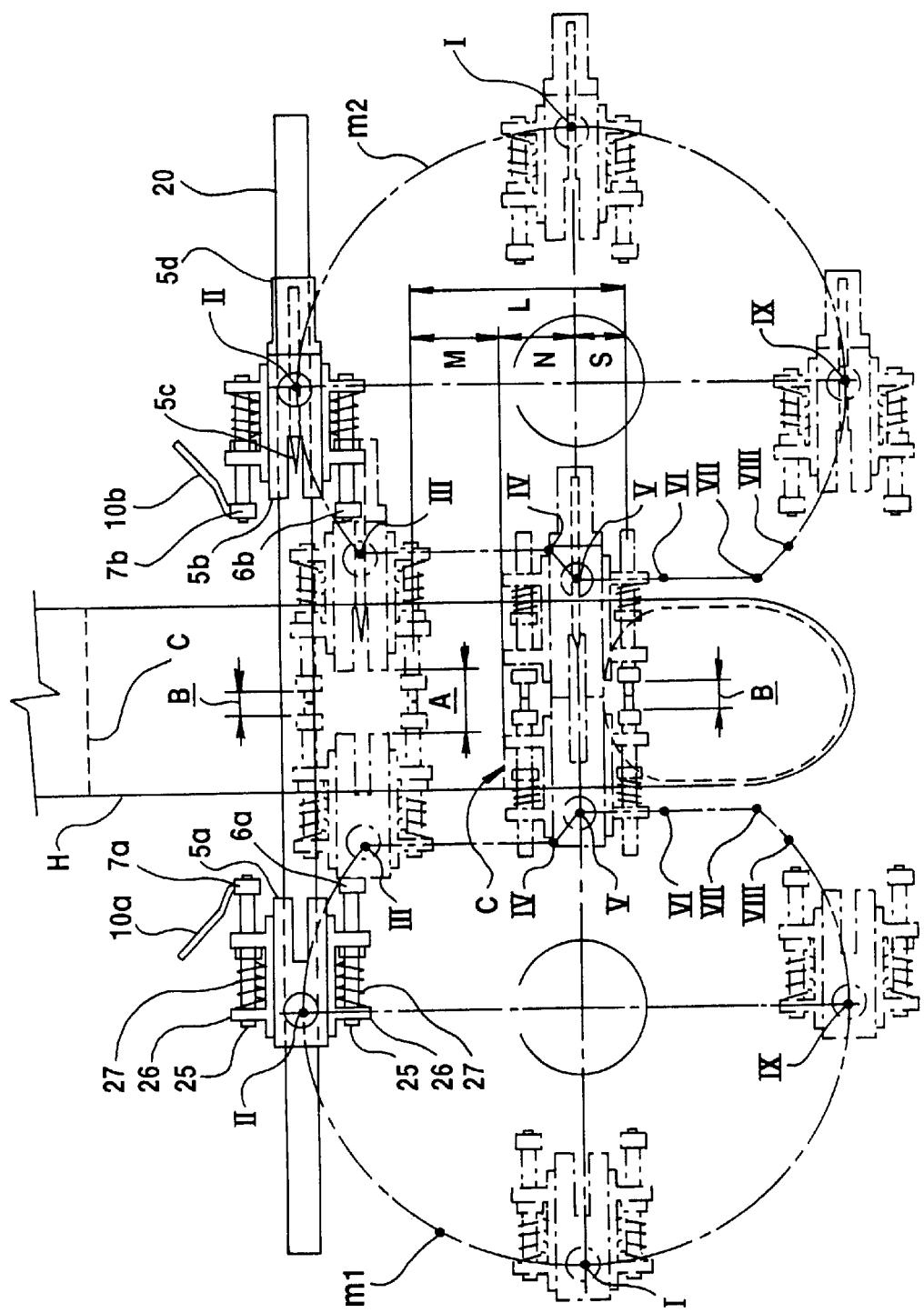
FIG. 5 shows the change in the circulating movement of an end-sealing (lateral-sealing) heaters and the downward movement of a packaging cylinder in the longitudinal type bag forming, filling and packaging machine to which the present invention is applied.

FIG. 5 shows a correlation between changes of the circulating motion of the end-sealing heater and the descending motion of the packaging cylinder in a case where the length of the bag is equal to the circumferential length of the circle the radius of which is the same as the radius of the arcuate section of the curved cam line of for the end-sealing (lateral-sealing) heater. As shown in the drawing, the pair of the end-sealing heaters 5a and 5b are moved in an arcuate manner and approaches each other from the most ascending points II where the heaters 5a and 5b are open. When the heaters 5a and 5b reach the points III where the heaters 5a and 5b are located close to each other, the heaters 5a and 5b are moved downwardly while maintaining their close positional relationship until the heaters 5a and 5b reach the points IV. Then, the heaters 5a and 5b are moved further closer to each other until the heaters 5a and 5b reach the points V where the heaters 5a and 5b are completely closed. Thereafter, the heaters 5a and 5b are moved downwardly to the points VII, and on the midway to the points VII the cutter 5c makes the cutting motion. The heaters 5a and 5b are moved in an arcuate manner away from each other from the points VII, passed through the most descending points IX, returningly moved upwardly while being moved further in the arcuate manner and open, passed through the ascending middle points I where the heaters 5a and 5b are the most open and located at the same level as the points IV, and returningly moved upwardly and in the arcuate manner while being moved close to each other, and finally, returned to the points II. In this manner, the heaters 5a and 5b make the symmetrical box motion.

FIGS. 3 and 4 show the motion of the novel stripping plates proposed by the same assignee of the present application (see Japanese Patent Application Laid-Open No. Hei. 7-186291).

Figure 6:
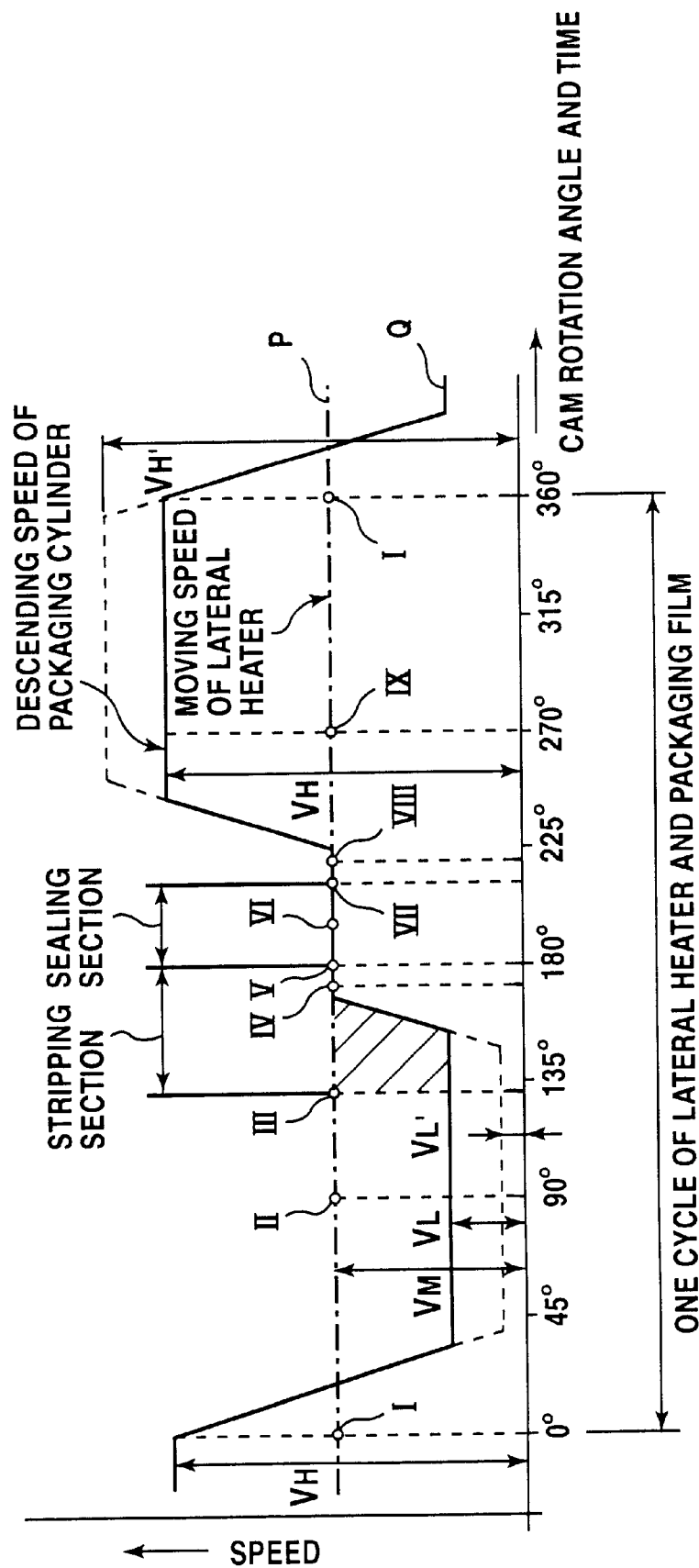
FIG. 6 is a speed-correlation diagram showing the change in the speed of the circulating movement of the end-sealing heater and the descending speed of the packaging cylinder in the longitudinal type bag forming, filling and packaging machine to which the present invention is applied (in a case where the length of the bag to be packaged is equal to the circumferential length of a circle the radius of which is the same as the radius of the arcuate portion of the curved cam line for the end sealing heater)

As shown in FIG. 5, the pair of the stripping plates 6a and 6b are supported on the lower surfaces of the pair of the end-sealing heaters 5a and 5b through supporting rods 25 and 25, respectively. The pair of the stripping plates 6a and 6b are protruded from the end-sealing heaters 5a and 5b so as to be closer to each other. The supporting rod 25 is slidably fitted into guide holes of a supporting plate 26 and biased by a spring 27 in the seal/seal-release directions. Each of the stripping plates 6a and 6b is provided at its end with an adjustment screw 28 the leading end of which is covered by a rubber or plastic cap 29 for shock absorbing and silencing purpose. The caps 29, 29 abut against each other while being protruded from the respective stripping plates 6a and 6b so as to ensure a clearance B between the pair of the stripping plates 6a and 6b when the stripping plates are closed. When the end-sealing heaters 5a and 5b are located at the points III where the heaters 5a and 5b are closed to each other with a clearance A, the pair of the stripping plates 6a and 6b are closed to each other with the clearance B smaller than the clearance A. The pair of the stripping plates 6a and 6b thus constructed are closed to each other while maintaining the clearance B when the end sealing heaters 5a and 5b during the box motion are moved to the points III where the heaters 5a and 5b are closed with the clearance A, and further, the pair of the stripping plates 6a and 6b are moved downwardly while maintaining the clearance B during the time when the end-sealing heaters 5a and 5b are moved downwardly from the points III to the points VIII. The pair of the stripping plates 6a and 6b can execute the stripping action by increasing the descending speed of the stripping plates 6a and 6b so as to be larger than the descending speed of the packaging cylinder H during the descending motion from the points III to the points V. The stripping stroke is in proportion to a speed difference between the descending speed of the stripping plates 6a and 6b and the descending speed of the packaging cylinder H. If the descending speed of the packaging cylinder H is zero during the stripping action by the stripping plates 6a and 6b, the stripping stroke becomes maximum. As shown in FIGS. 5 and 6, when the end-sealing heaters 5a and 5b make the box motion and reach the points III where the heaters 5a and 5b are closed with the clearance A, the pair of the stripping plates 6a and 6b are closed with the clearance B to flatten the packaging cylinder H, and thereafter the thus closed stripping plates 6a and 6b execute such stripping action as to be moved downwardly from the position upper than the cut position C of the packaging cylinder H through the cut position C to the position lower than the same at a speed higher than a speed of the packaging cylinder H. In a case where the product to be packaged is located upwardly from the end-sealing position of the packaging cylinder H, the stripping plates 6a and 6b forcibly push the product downwardly so as to avoid the error in which the end-sealing heaters 5a and 5b execute the end-sealing with the product bitten therein. Further, the stripping plates 6a and 6b also serve to avoid the explosion of the bag by permitting the excess air inside the bag and below the stripping plates 6a and 6b to escape upwardly therefrom. As described above, the stripping plates 6a and 6b which can approach each other are different in function from the conventional shutters.

A pair of shutters 7a and 7b in FIG. 5 are installed on the upper surface of the end-sealing heaters 5a and 5b so as to be the same structure as that for the pair of stripping plates 6a and 6b, and provided with receptacle plates 10a and 10b, respectively. The supporting rod 25 is slidably fitted into a guide hole of a supporting guide 26 fixed to the end-sealing heater 5a (or 5b) and biased by a spring 27 in a sealing direction. Therefore, the pair of the shutter plates 7a and 7b are operated similarly to the pair of the stripping plates 6a and 6b in such a manner that the shutter plates 7a and 7b are closed with the clearance B to flatten the packaging cylinder H when the end-sealing heaters 5a and 5b make the box motion to reach the points III where the heaters 5a and 5b are closed with the clearance A, and thereafter the thus closed shutters 7a and 7b are moved relatively downwardly at a speed higher than the speed of the packaging cylinder H to permit the excess air inside the bag and below the stripping plates 6a and 6b to escape upwardly therefrom.

FIG. 6 shows a speed-correlation between the changes in the speed of the circulating motion or the end-sealing heater used in the prior applications, and the descending speed of the packaging cylinder, particularly in a case where the length of the bag to be packaged is equal to the circumferential length of a circle the radius of which is the same as the radius of the arcuate section of the curved cam line for the end-sealing heater. The points I, II, III, . . . VIII and IX for the end-sealing heaters 5a and 5b in FIG. 5 correspond to points I, II, III, . . . VIII and IX in FIG. 6, respectively. As indicated by a line P, the end-sealing heaters are moved circulatingly at a constant, middle speed VM. Precisely, the swinging levers 17a, 17b, 18a and 18b in FIG. 4 are rotated at a constant speed, and the speed of the end-sealing heaters is increased or decreased from the points III to the points VI, but can be considered to be approximately constant. As indicated by a line Q, the descending speed of the packaging cylinder is set at a high speed VH until the end-sealing heaters reach the points I, subsequently reduced to be a low speed VL after the end-sealing heaters reach the points I, subsequently maintained to be the low speed VL when the end-sealing heaters are passed through the points II and III, and subsequently increased to be the synchronized middle speed VM before the end-sealing heaters are passed through the points IV so that the cutter is positioned in alignment with the cut position of the packaging cylinder. Thereafter, the descending speed of the packaging cylinder is maintained to be the middle speed VM when the end-sealing heaters are passed through the points IV, V, VI, VII and VIII, and increased to be the high speed VH immediately after the end-sealing heaters are passed through the points VIII. Subsequently, the high speed VH is maintained until the end-sealing heaters reach the points I through the points IX.

FIG. 6 also shows the stripping action in association with the sealing action. In the figure, the stripping section of the stripping plates is defined from a time point, at which the stripping plates are closed as the end-sealing heaters reaches the points III where the end-sealing heaters are closed to each other, to a time point at which the end-sealing heater reach the points V where the end-sealing heaters are completely closed to each other. The stripping stroke is indicated by the size of an hatched area. Setting the moving speed of the cut position of the packaging cylinder at a lower speed VL' can make the stripping stroke larger but must modify the speed VH to be a higher speed VH'.

Figure 7:
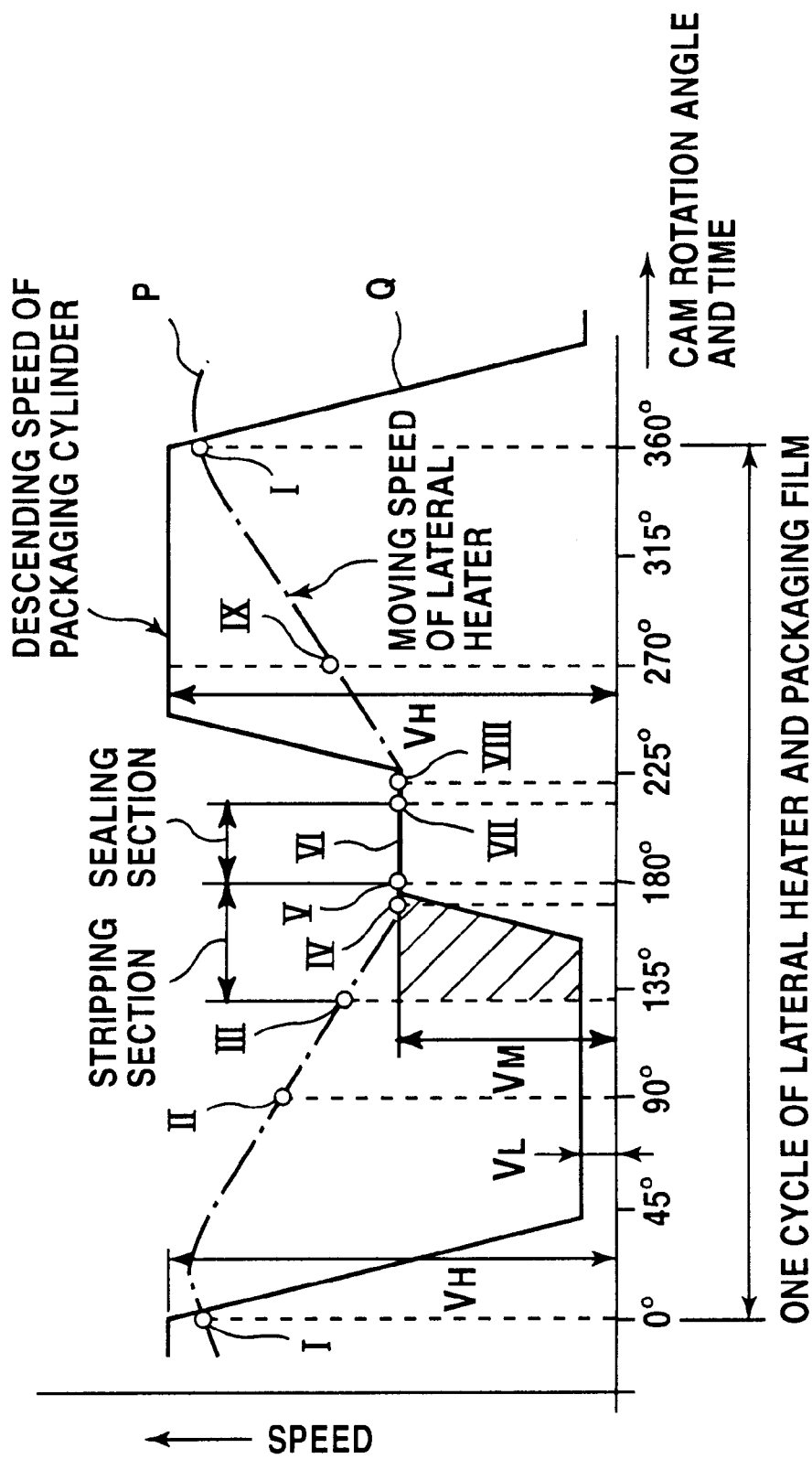
FIG. 7 is a speed-correlation diagram showing the change in the speed of the circulating movement of the end-sealing heater and the descending speed of the packaging cylinder in the longitudinal type bag forming, filling and packaging machine to which the present invention is applied (in a case where the length of the bag to be packaged is shorter than the circumferential length of a circle the radius of which is the same as the radius of the arcuate portion of the curved cam line for the end sealing heater)

FIG. 7 shows a speed-correlation between the changes in the circulating moving speed of the end-sealing heater and the descending speed of the packaging cylinder in a case where the length of the bag to be packaged is shorter than the circumferential length of the circle the radius of which is the same as the radius of the curved cam line for the end-sealing heater. As shown by the line P, the speed of the end-sealing heaters is substantially reduced while the end-sealing heaters are moved in a section from the points I to the points IV, maintained at the constant middle speed VM while the end-sealing heaters are moved in a section from the points IV to the points VIII, and substantially increased while the end-sealing heaters are moved in a section from the points VIII to the points I. As shown by the line Q, the descending speed of the packaging cylinder is set to be a high speed VH until the end-sealing heaters reach the points I, subsequently reduced to be a low speed VL after the end-sealing heaters reach the points I, and subsequently maintained to be the lower speed VL while the end-sealing heaters are passed through the points II and III. Subsequently, the descending speed of the packaging cylinder is increased before the end-sealing heaters are passed through the points IV, and set to be a synchronized middle speed VM before the end-sealing heaters are passed through the points V. The stripping plates strip the packaging cylinder while the end-sealing heaters are moved from the points III to the points IV, and the cutter is positioned in alignment with the cut position of the packaging cylinder when the speed of the end-sealing heaters and the packaging cylinder becomes the middle speed VM. Subsequently, the descending speed of the packaging cylinder is maintained at the middle speed VM until the end-sealing heaters reach the points VIII through the points V, VI and VII, increased to be the high speed VH immediately after the end-sealing heaters are passed through the points VIII, and maintained at the high speed VH until the end-sealing heaters reach the points I through the points IX.

Figure 8:
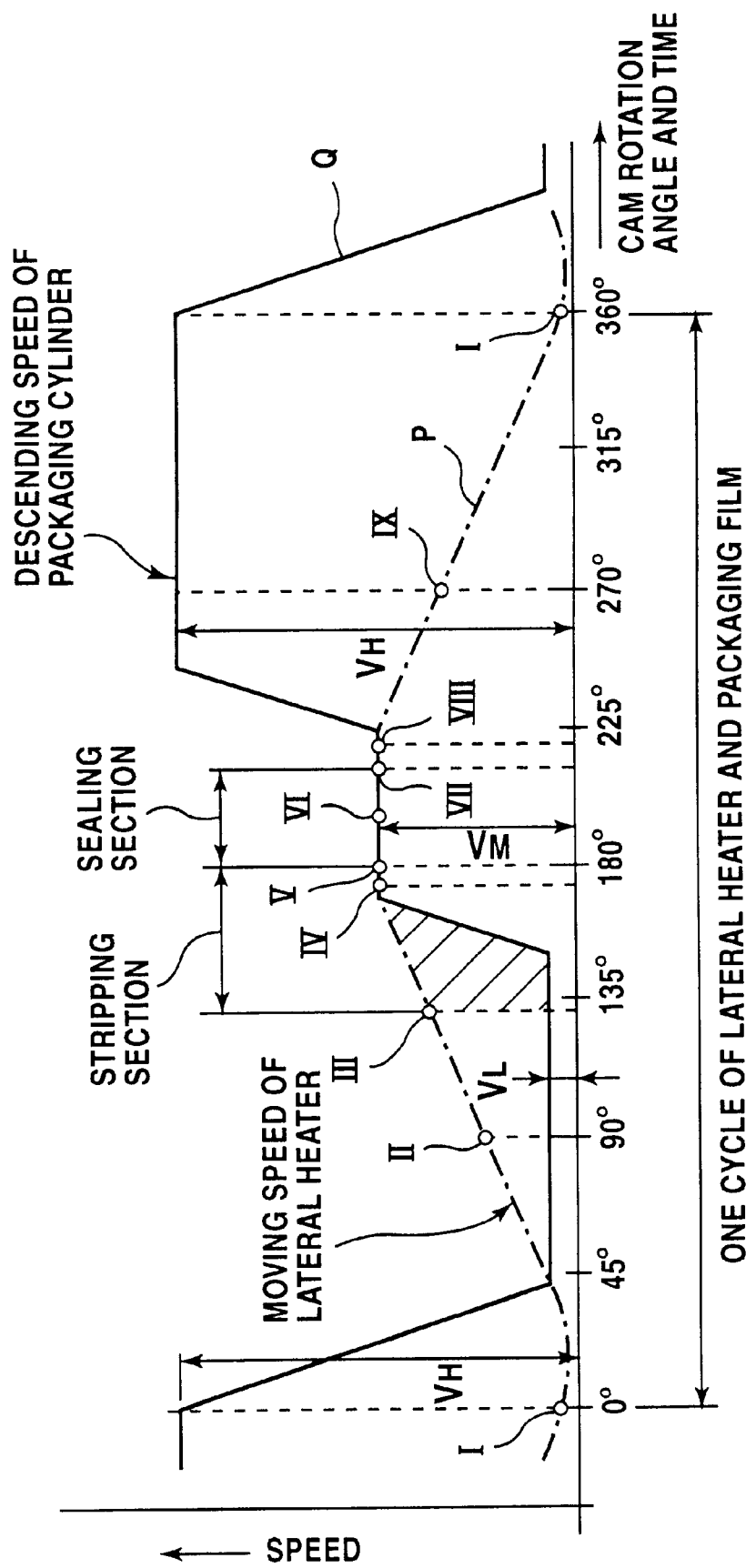
FIG. 8 is a speed-correlation diagram showing the change in the speed of the circulating movement of the end-sealing heater and the descending speed of the packaging cylinder in the longitudinal type bag forming, filling and packaging machine to which the present invention is applied (in a case where the length of the bag to be packaged is longer than an order of magnitude of the circumferential length of a circle the radius of which is the same as the radius of the arcuate portion of the curved cam line for the end sealing heater, but shorter than two orders of magnitude of the circumferential length)

FIG. 8 shows a speed-correlation between the changes in the circulating moving speed of the end-sealing heater and the descending speed of the packaging cylinder in a case where the length of the bag to be packaged is longer than an order of magnitude of the circumferential length of the circle the radius of which is the same as the radius of the curved cam line for the end-sealing heater, but shorter than two orders of magnitude of the circumferential length. As shown by the line P, the speed of the end-sealing heaters is substantially increased while the end-sealing heaters are moved in a section from the points I to the points IV, maintained at the synchronized constant middle speed VM while the end-sealing heaters are moved in a section from the points IV to the points VIII, and substantially reduced while the end-sealing heaters are moved in a section from the points VIII to the points I. As shown by the line Q, the descending speed of the packaging cylinder is set to be a high speed VH until the end-sealing heaters reach the points I, subsequently reduced to be a low speed VL after the end-sealing heaters reach the points I, and subsequently maintained to be the lower speed VL while the end-sealing heaters are passed through the points II and III. Subsequently, the descending speed of the packaging cylinder is increased to be a synchronized middle speed VM before the end-sealing heaters are passed through the points IV. The stripping plates strip the packaging cylinder while the end-sealing heaters are moved from the points III to the points IV, and the cutter is positioned in alignment with the cut position of the packaging cylinder when the speed of the end-sealing heaters and the packaging cylinder becomes the middle speed VM. Subsequently, the descending speed of the packaging cylinder is maintained at the middle speed VM until the end-sealing heaters reach the points VIII through the points IV, V, VI and VII, subsequently increased to be the high speed VH immediately after the end-sealing heaters are passed through the points VIII, and maintained at the high speed VH until the end-sealing heaters reach the points I through the points IX.

Figure 9:
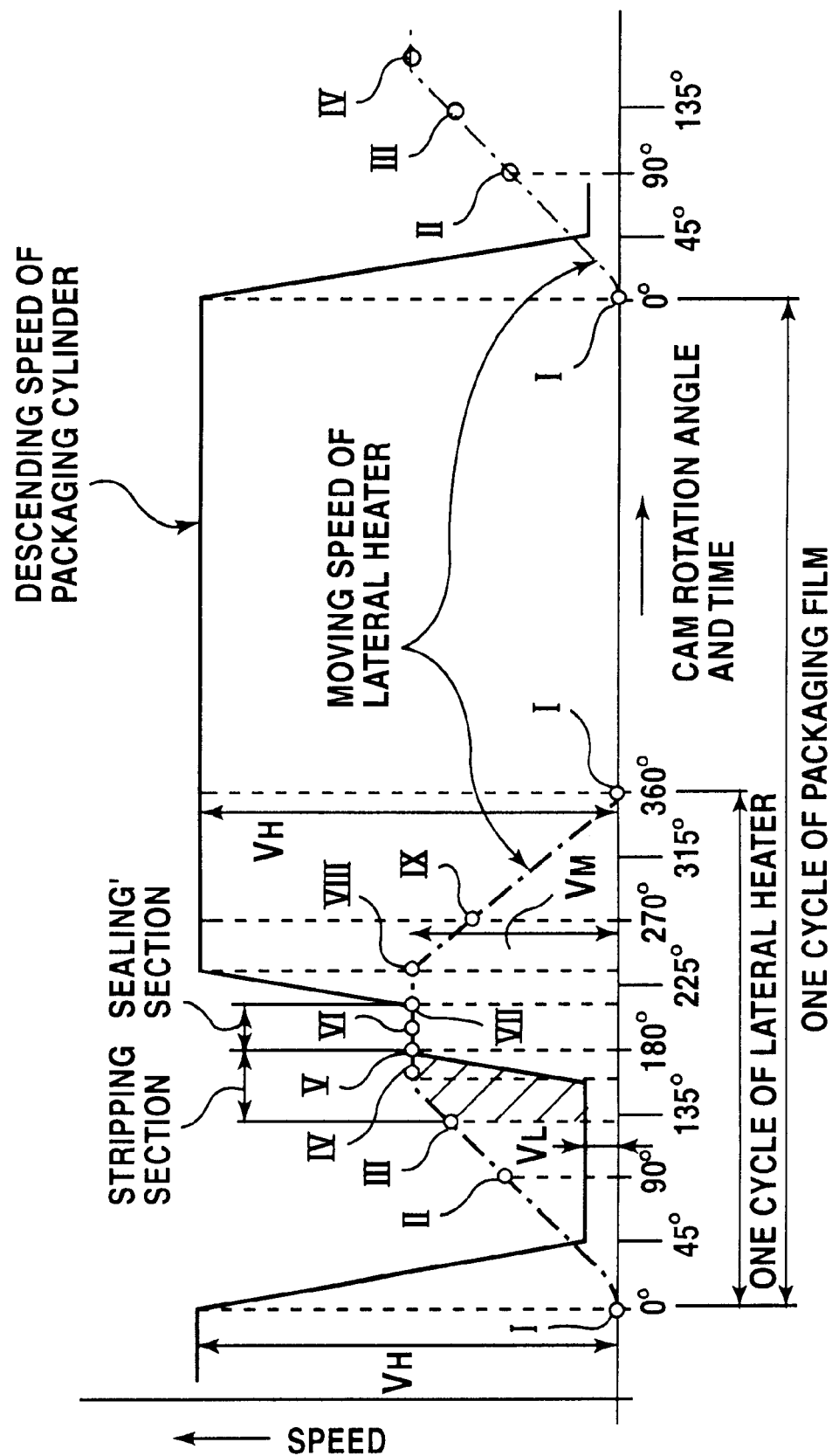
FIG. 9 is a speed-correlation diagram showing the change in the speed of the circulating movement of the end-sealing heater and the descending speed of the packaging cylinder in the longitudinal type bag forming, filling and packaging machine to which the present invention is applied (in a case where the length of the bag to be packaged is longer than two orders of magnitude of the circumferential length of a circle the radius of which is the same as the radius of the arcuate portion of the curved cam line for the end sealing heater)

FIG. 9 shows a speed-correlation between the changes in the circulating moving speed of the end-sealing heater and the descending speed of the packaging cylinder in a case where the length of the bag to be packaged is longer than two orders of magnitude of the circumferential length of the circle the radius of which is the same as the radius of the curved cam line for the end-sealing heater. As shown by the line P, the speed of the end-sealing heaters is increased from a zero speed while the end-sealing heaters are moved in a section from the points I to the points IV, maintained at the synchronized constant middle speed VM while the end-sealing heaters are moved in a section from the points IV to the points VIII, and reduced to a zero speed while the end-sealing heaters are moved in a section from the points VIII to the points I. When the subsequent cut position of the packaging cylinder is moved downwardly to a predetermined position, the speed of the end-sealing heaters is increased again. As shown by the line Q, the descending speed of the packaging cylinder is set to be a high speed VH until the end-sealing heaters reach the points I, subsequently reduced to be a low speed VL after the end-sealing heaters reach the points I, and subsequently maintained to be the lower speed VL while the end-sealing heaters are passed through the points II and III. Subsequently, the descending speed of the packaging cylinder is increased before the end-sealing heaters are passed through the points IV and set to be a synchronized middle speed VM before the end-sealing heaters are passed through the points V. The stripping plates strip the packaging cylinder while the end-sealing heaters are moved from the points III to the points IV, and the cutter is positioned in alignment with the cut position of the packaging cylinder when the speed of the end-sealing heaters and the packaging cylinder becomes the middle speed VM. Subsequently, the descending speed of the packaging cylinder is maintained at the middle speed VM until the end-sealing heaters reach the points VII through the points V and VI, subsequently increased to be the high speed VH immediately after the end-sealing heaters are passed through the points VII, and maintained at the high speed VH until the end-sealing heaters reach the points I where the end-sealing heaters start making the next box motion.

As described above, the moving section in which the end-sealing heaters 5a and 5b are moved from the points III to the points V in FIG. 5 corresponds to the sections from the points III to the points V in the speed-correlation diagrams of FIGS. 6 to 9, and in either of the cases, when the end-sealing heaters 5a and 5b reach the points III, the stripping plates 6a and 6b are moved close to each other at points III to flatten the packaging cylinder H. Thereafter, the stripping plates 6a and 6b execute stripping action on the packaging cylinder by transferring the flattened portion of the packaging cylinder H downwardly until the end-sealing heaters 5a and 5b reach the points V where the end-sealing heaters 5a and 5b are to be closed to each other, since the descending speed of the end-sealing heaters 5a and 5b is larger than the descending speed of the packaging cylinder H.

Shown in the speed-correlation diagrams of FIGS. 6 to 9 are the speed-correlation of the rotational speed of the first and second servo-motors 8a and 8b shown in FIG. 2. As shown in FIG. 5, since the end-sealing heaters 5a and 5b are closed to each other to apply the end-sealing onto the packaging cylinder when the end-sealing heaters 5a and 5b reach the points V, the descending speed of the end-sealing heaters must be made coincident with the descending speed of the packaging cylinder. Therefore, in either of the speed-correlation diagrams in FIGS. 6 to 9, the descending speed of the end-sealing heaters is made coincident with the descending speed of the packaging cylinder immediately before the end-sealing heaters reach the points V.

As shown in FIG. 5, when the end-sealing heaters 5*a* and 5*b* reach the points V, the cutter 5*c* and the cut position C of the packaging cylinder H must be made coincident with each other. Shown in either of the speed-correlation diagrams in FIGS. 6 to 9 is simply the speed-correlation of the first and second servo-motors 8*a* and 8*b* shown in FIG. 2. Therefore, the original point signals are taken out, respectively, from the drive rotation of the first and second servo-motors 8*a* and 8*b* shown in FIG. 2, and the actual rotation position and the actual rotation speed are fed back to each of the servo-motors 8*a* and 8*b*, so that the servo-motors 8*a* and 8*b* are closed-loop controlled, respectively. By this closed-loop control, as shown in FIG. 5, the cut position C of the packaging cylinder H is phase-shifted downwardly from the cutter 5*c* by a dimension M when the end-sealing heaters 5*a* and 5*b* reach the points III, and the cut position C of the packaging cylinder H is moved by a dimension N so as to be coincident with the points V where the end-sealing heaters 5*a* and 5*b* are closed to each other when the stripping plates 6*a* and 6*b* are moved by the stripping stroke L as a consequence of the descending movement of the end-sealing heaters 5*a* and 5*b* by a dimension L from the points III to the points V. Accordingly, the substantive stripping stoke is an amount of L−N, and a dimension, by which the stripping plates 6*a* and 6*b* push the product to be package downwardly from the cut position C of the packaging cylinder H, is an amount of S=L−(M+N).

Next, a positional correlation among the end-sealing heaters, the stripping plates and the packaging cylinder, and a packaging process for the product to be packaged will be described with reference to FIGS. 10 to 18.

Figure 10:
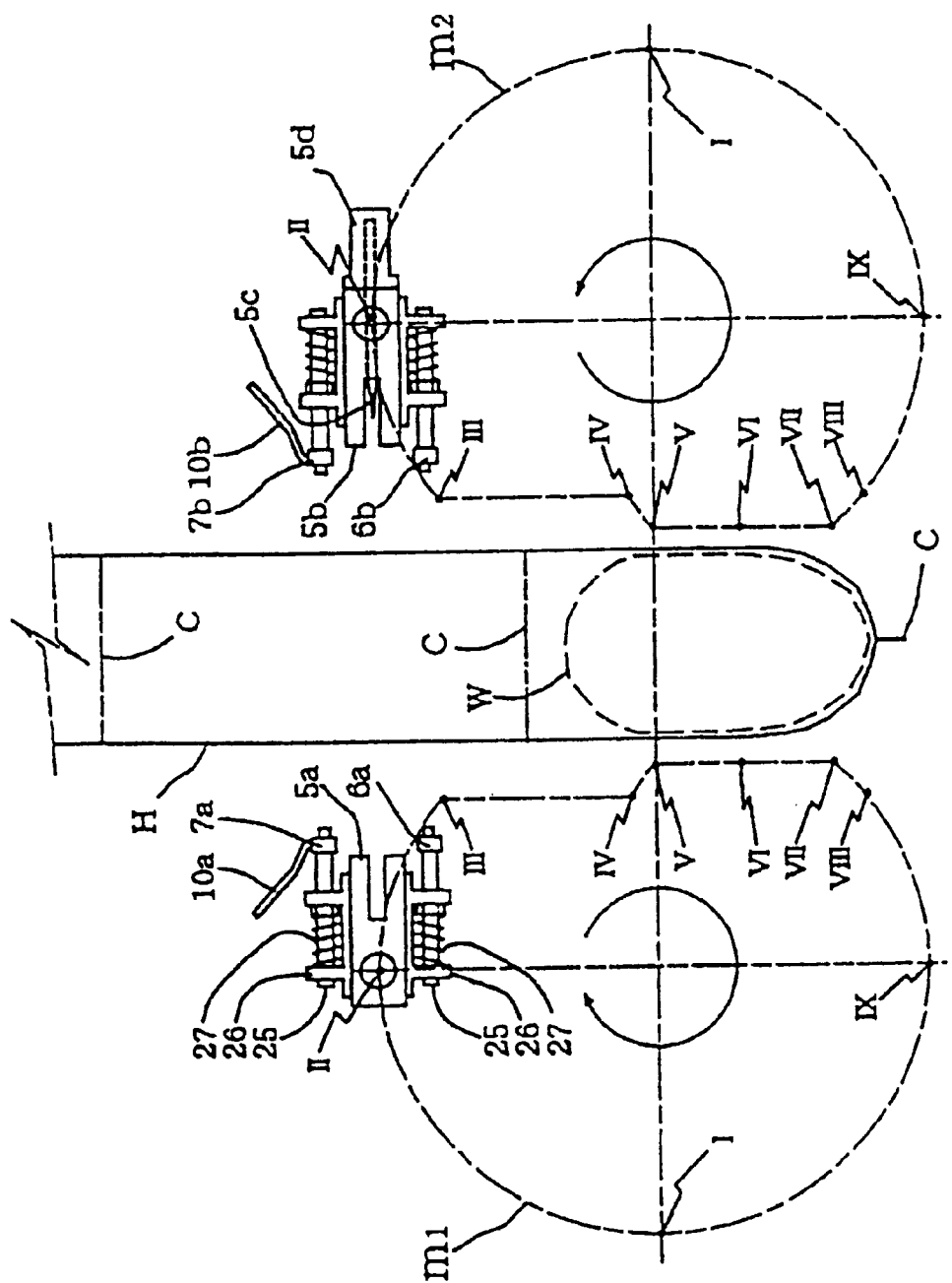
FIG. 10 is an explanatory diagram (No. 1) for a positional correlation among the end-sealing heaters, the stripping plates and the packaging cylinder and a packaging process for the product to be packaged in the longitudinal type bag forming, filling and packaging machine to which the present invention is applied.
Figure 11:
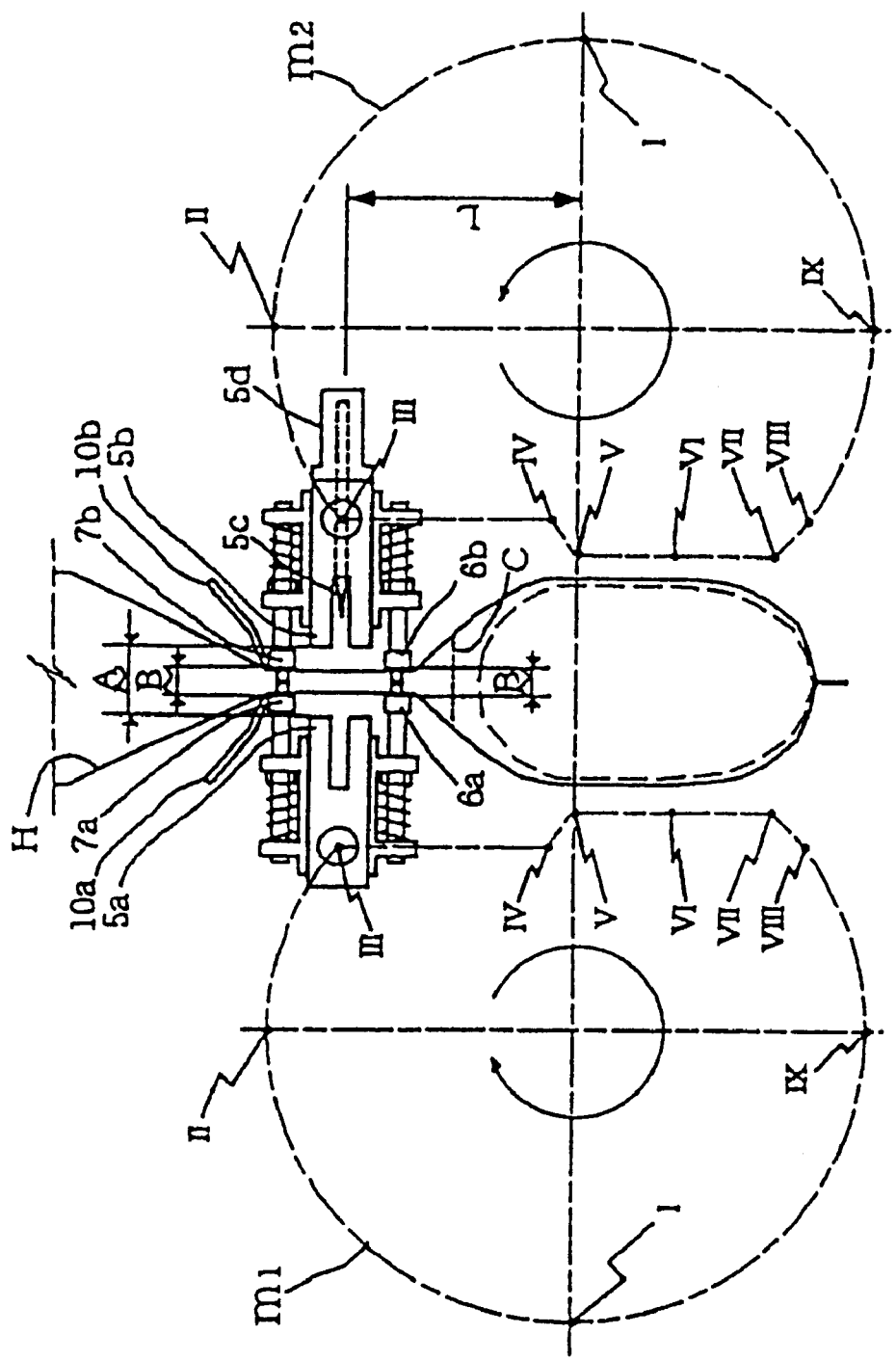
FIG. 11 is an explanatory diagram (No. 2) for a positional correlation among the end-sealing heaters, the stripping plates and the packaging cylinder and a packaging process for the product to be packaged in the longitudinal type bag forming, filling and packaging machine to which the present invention is applied.

FIG. 10 shows a state in which the end-sealing heaters 5*a* and 5*b* is returned to the points II. A product W to be packaged has already been filled into the packaging cylinder H, and the cut position C has already been positioned below the points III. As shown in FIGS. 6 to 9, the descending speed of the packaging cylinder H is extremely slow, and the speed of the end-sealing heaters 5*a* and 5*b* is larger than the descending speed of the packaging cylinder H. Therefore, the end-sealing heaters 5*a* and 5*b* make such an arcuate motion that a horizontal moving component is large and a vertical moving component is small. The product W to be packaged is shown as being largely bulky. FIG. 11 shows a state in which the end-sealing heaters 5*a* and 5*b* have reach the points III to be closed to each other with the clearance A as well as the stripping plates 6*a* and 6*b* and the shutters 7*a* and 7*b* have been closed respectively with the clearance B. The perpendicular distance from the cutter 5*c* to the center of the circulating motion of the end-sealing heaters 5*a* and 5*b* is equal to the stripping stroke L shown in FIG. 5. Since the stripping plates 6*a* and 6*b* and the shutters 7*a* and 7*b* are made to flatten the packaging cylinder H, the cut position C becomes slightly higher. When the end-sealing heaters 5*a* and 5*b* reach the points III, the horizontal moving component disappears, so that the descending speed is abruptly changed to the faster one, and the stripping plates 6*a* and 6*b* apply the stripping action onto the packaging cylinder H stopped or downwardly moved at a low speed before the end-sealing heaters 5*a* and 5*b* reach the points IV.

Figure 12:
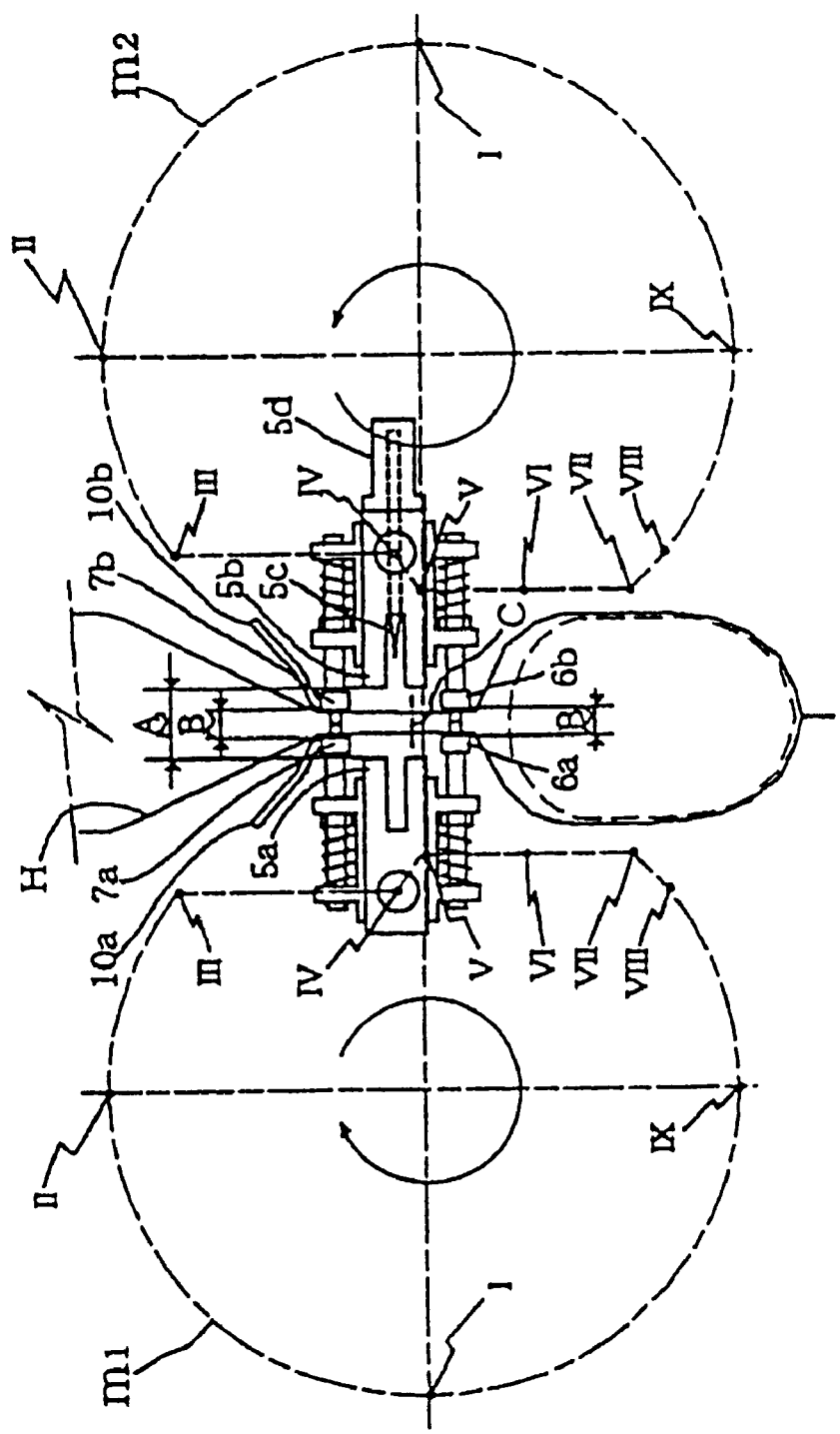
FIG. 12 is an explanatory diagram (No. 3) for a positional correlation among the end-sealing heaters, the stripping plates and packaging cylinder and a packaging process for the product to be packaged in the longitudinal type bag forming, filling and packaging machine to which the present invention is applied.

FIG. 12 shows a state in which the end-sealing heaters 5*a* and 5*b* reach the points IV. From this state, the end-sealing heaters 5*a* and 5*b* are further closed to each other. The descending speed of the packaging cylinder H is increased slightly before the end-sealing heaters 5*a* and 5*b* reach the points IV. The closed states of the stripping plates 6*a* and 6*b* and the shutters 7*a* and 7*b* are maintained without any further approaching movements.

Figure 13:
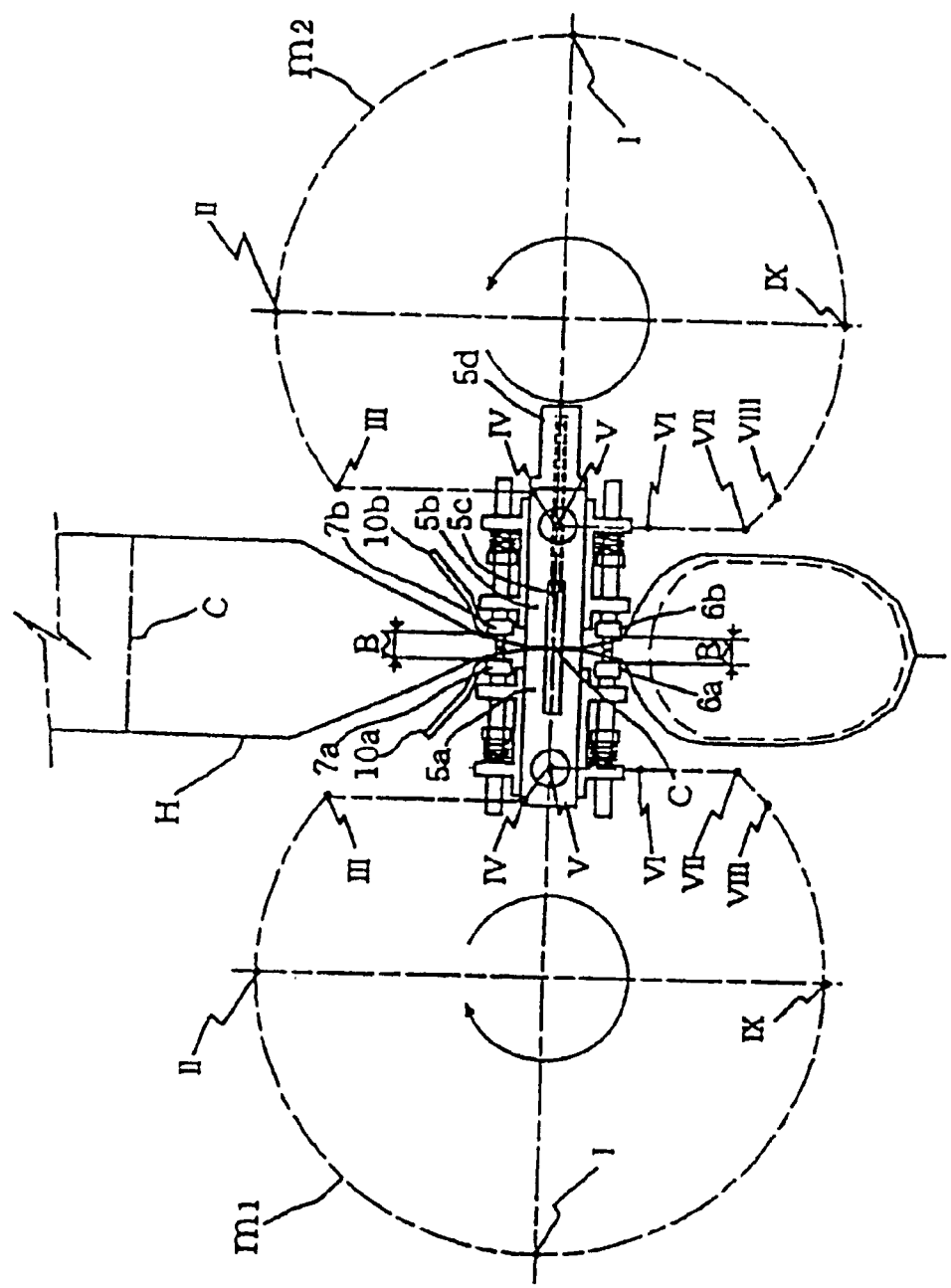
FIG. 13 is an explanatory diagram (No. 4) for a positional correlation among the end-sealing heaters, the stripping plates and packaging cylinder and a packaging process for the product to be packaged in the longitudinal type bag forming, filling and packaging machine to which the present invention is applied.

FIG. 13 shows a state in which the end-sealing heaters 5*a* and 5*b* reach the points V where the heaters 5*a* and 5*b* are completely closed to start the end-sealing (lateral-sealing). The descending speed of the end-sealing heaters 5*a* and 5*b* and the packaging cylinder H becomes the middle speed VM for synchronization as shown in FIGS. 6 to 9.

Figure 14:
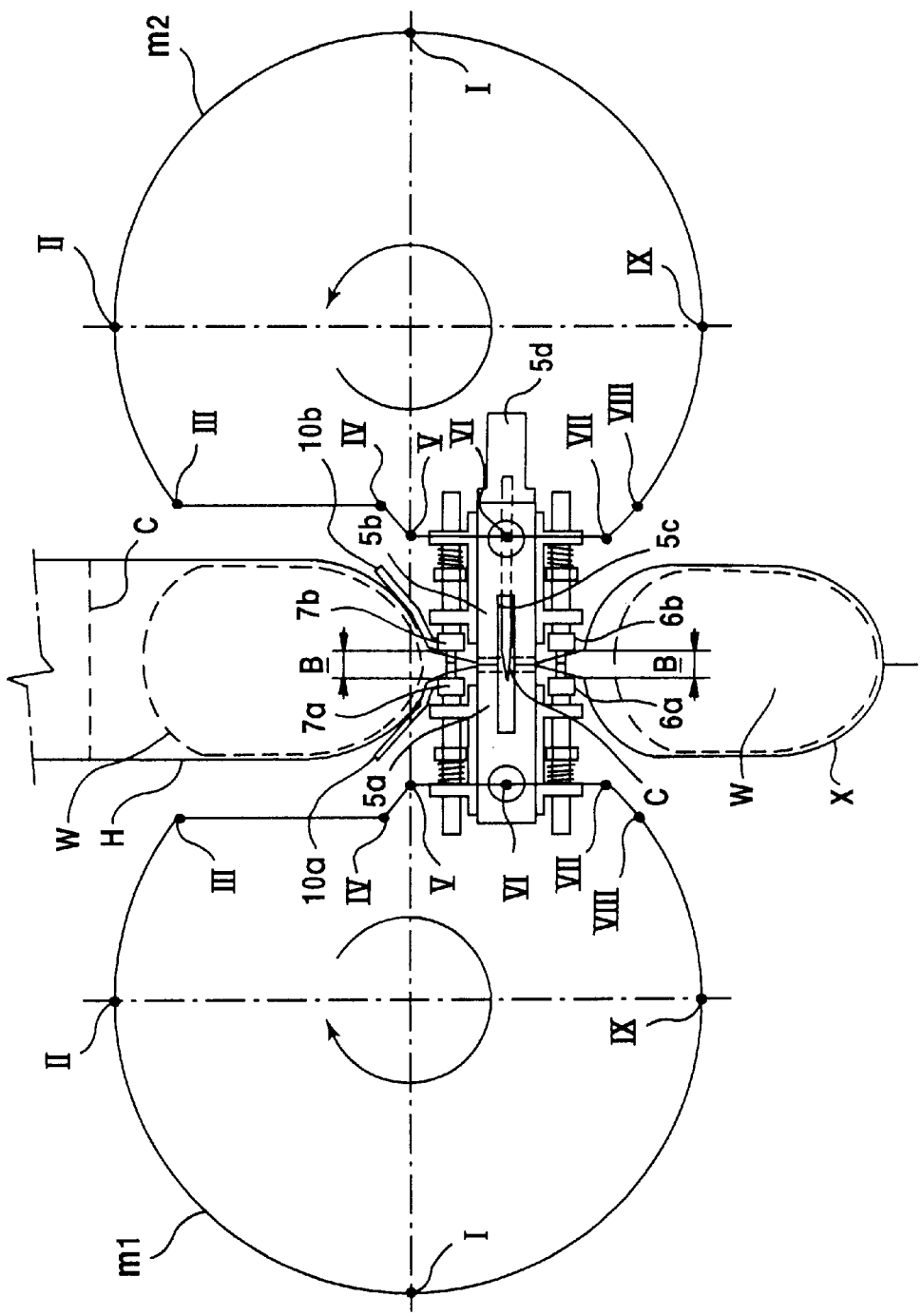
FIG. 14 is an explanatory diagram (No. 5) for a positional correlation among the end-sealing heaters, the stripping plates and packaging cylinder and a packaging process for the product to be packaged in the longitudinal type bag forming, filling and packaging machine to which the present invention is applied.

FIG. 14 shows a state in which the end-sealing heaters 5*a* and 5*b* reach the points VI while applying lateral two-row sealing, and the cutter 5*c* is protruded to cut the cut position C of the packaging cylinder H. In this state, another product W to be subsequently packaged is received by reception plates 10*a* and 10*b* added to the shutters 7*a* and 7*b*.

Figure 15:
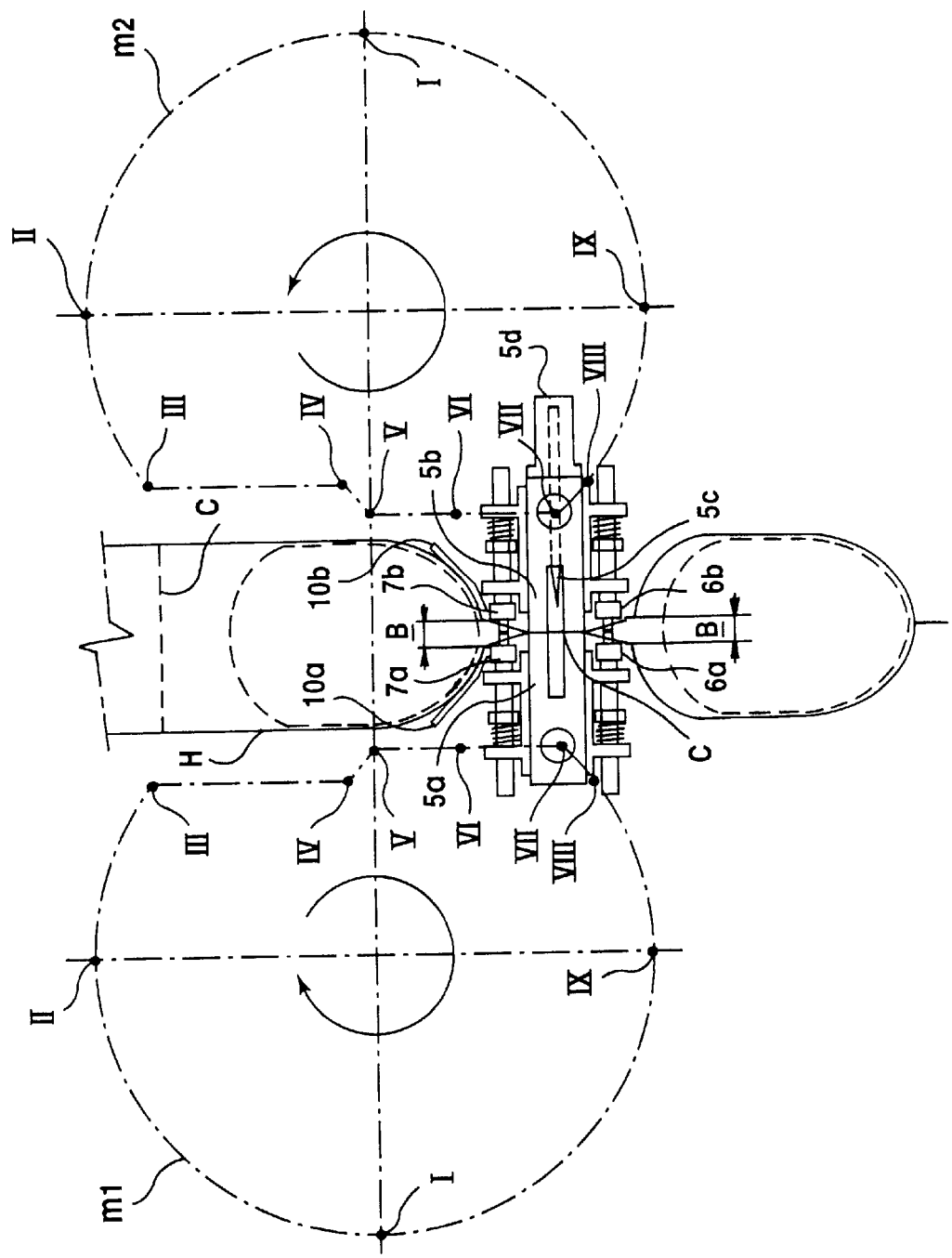
FIG. 15 is an explanatory diagram (No. 6) for a positional correlation among the end-sealing heaters, the stripping plates and packaging cylinder and a packaging process for the product to be packaged in the longitudinal type bag forming, filling and packaging machine to which the present invention is applied.

FIG. 15 shows a state in which the cutter 5*c* is retracted, and the end-sealing heaters 5*a* and 5*b* reach the points VIII where the lateral two-row sealing is complete. From this state, the end-sealing heaters 5*a* and 5*b* begin to open, but the stripping plates 6*a* and 6*b* and the shutters 7*a* and 7*b* remain closed.

Figure 16:
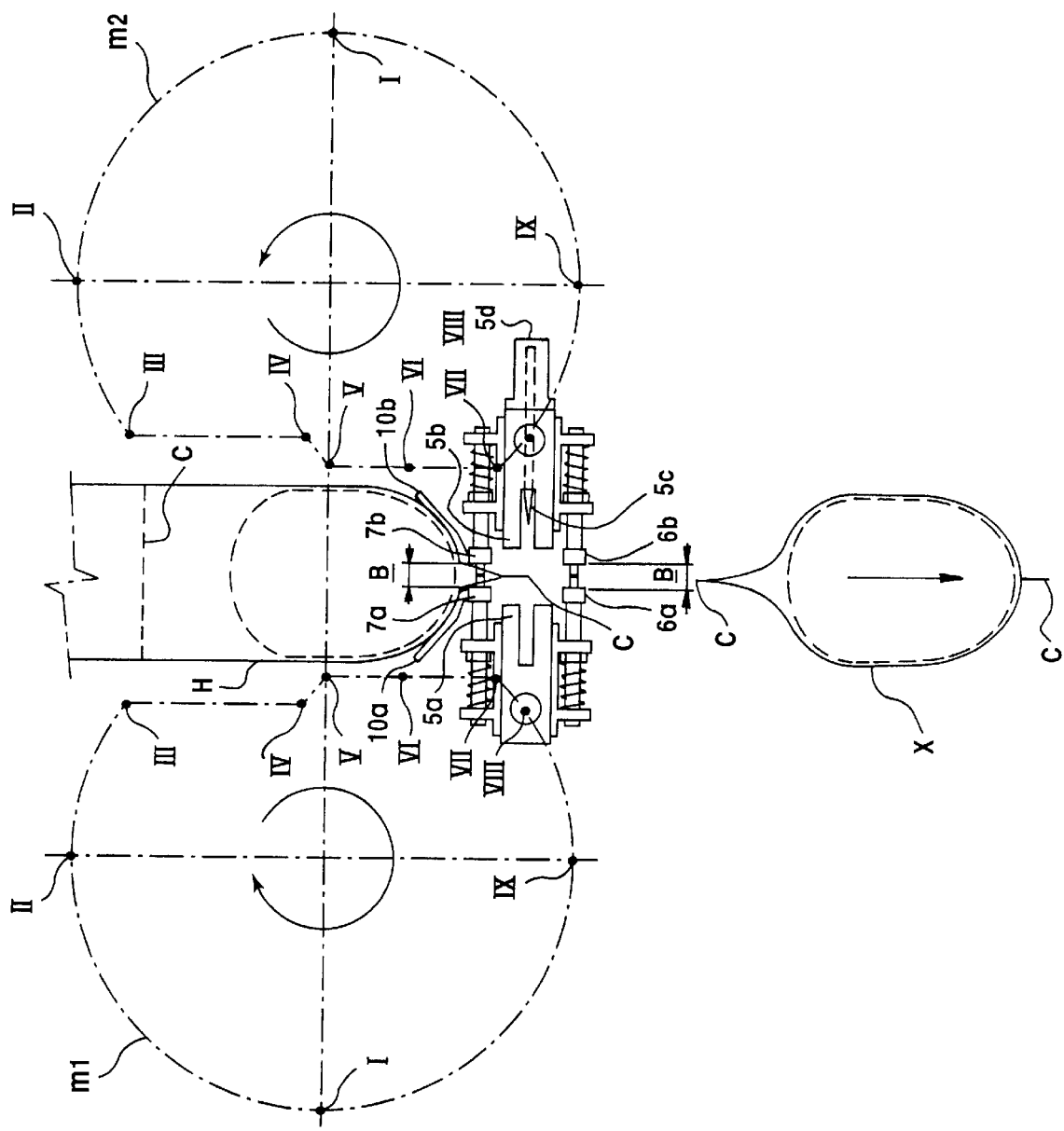
FIG. 16 is an explanatory diagram (No. 7) for a positional correlation among the end-sealing heaters, the stripping plates and packaging cylinder and a packaging process for the product to be packaged in the longitudinal type bag forming, filling and packaging machine to which the present invention is applied.

FIG. 16 shows a state in which the end-sealing heaters 5*a* and 5*b* reach the points VIII, and the stripping plates 6*a* and 6*b* and the shutters 7*a* and 7*b* begin to open. In this state, since the end-sealing heaters 5*a* and 5*b* are open, the bag-packaged product X is fallen downwardly.

Figure 17:
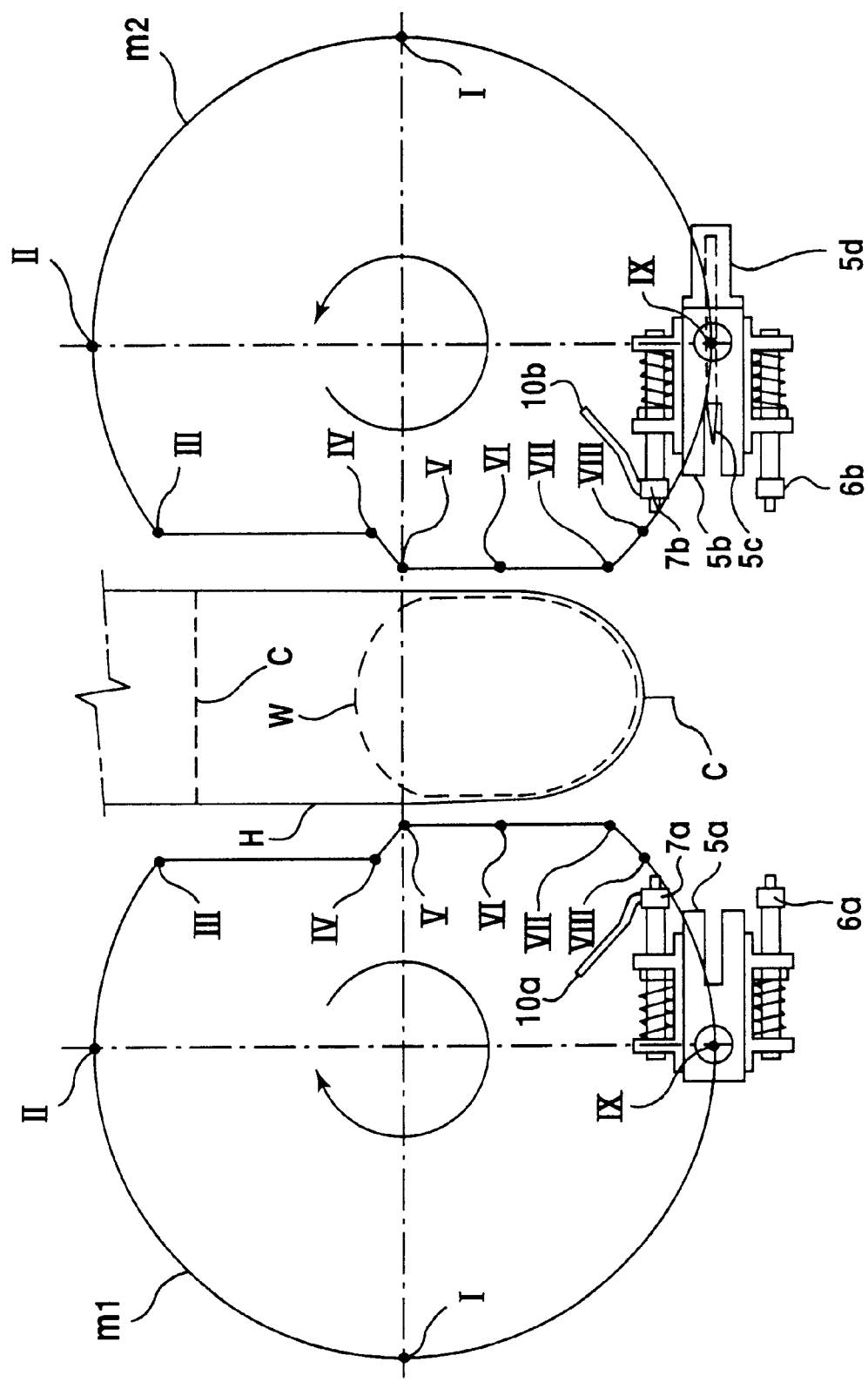
FIG. 17 is an explanatory diagram (No. 8) for a positional correlation among the end-sealing heaters, the stripping plates and packaging cylinder and a packaging process for the product to be packaged in the longitudinal type bag forming, filling and packaging machine to which the present invention is applied.

FIG. 17 shows a state in which the end-sealing heaters 5*a* and 5*b* reach the points IX. The end-sealing heaters 5*a* and 5*b* is open until the stripping plates 6*a* and 6*b* and the shutters 7*a* and 7*b* end the closed states' thereof, and further open integrally with the stripping plates 6*a* and 6*b* and the shutters 7*a* and 7*b*. In this state, the descending speed of the packaging cylinder H is increased.

Figure 18:
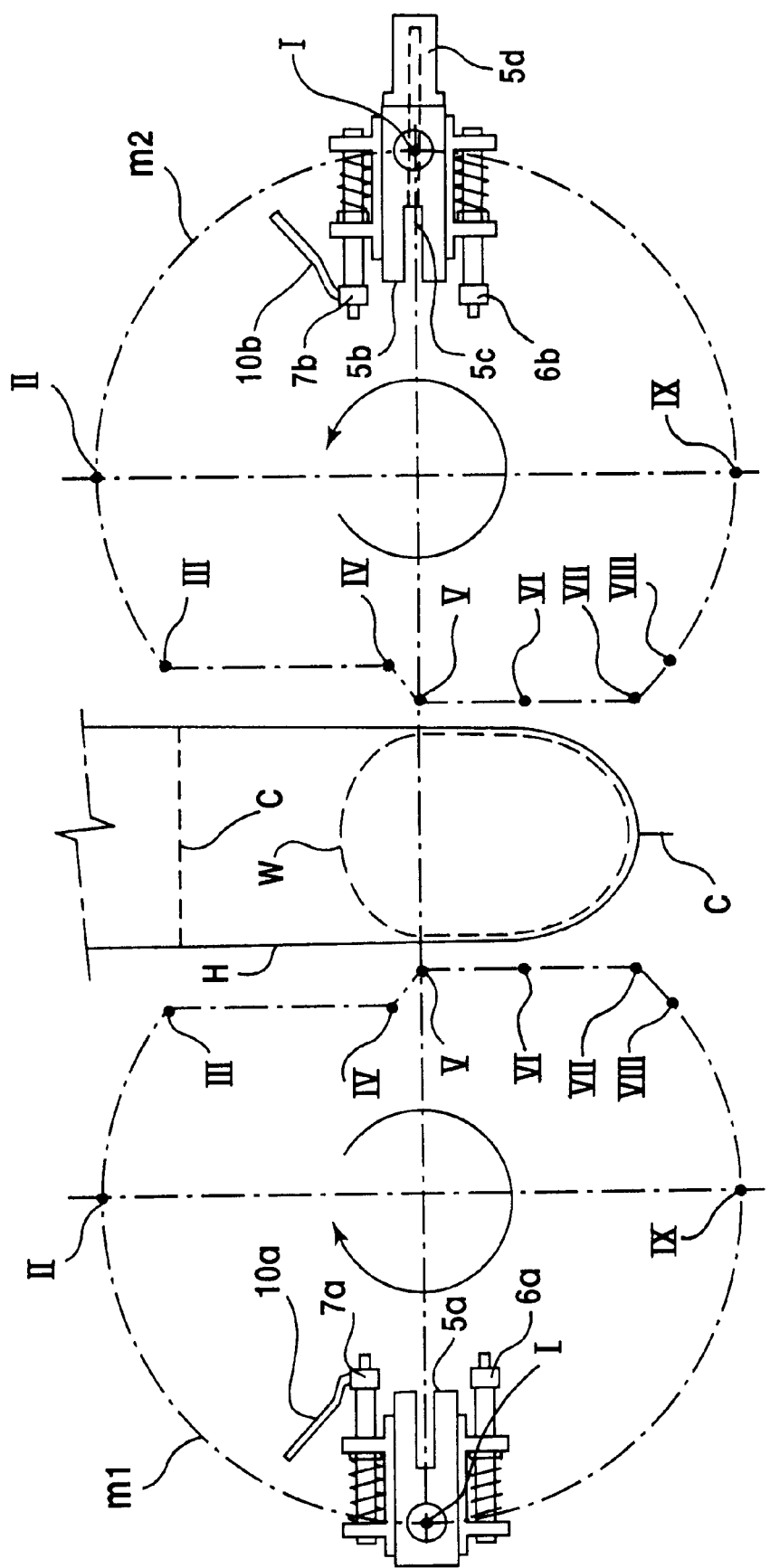
FIG. 18 is an explanatory diagram (No. 9) for a positional correlation among the end-sealing heaters, the stripping plates and packaging cylinder and a packaging process for the product to be packaged in the longitudinal type bag forming, filling and packaging machine to which the present invention is applied.
Figure 19:
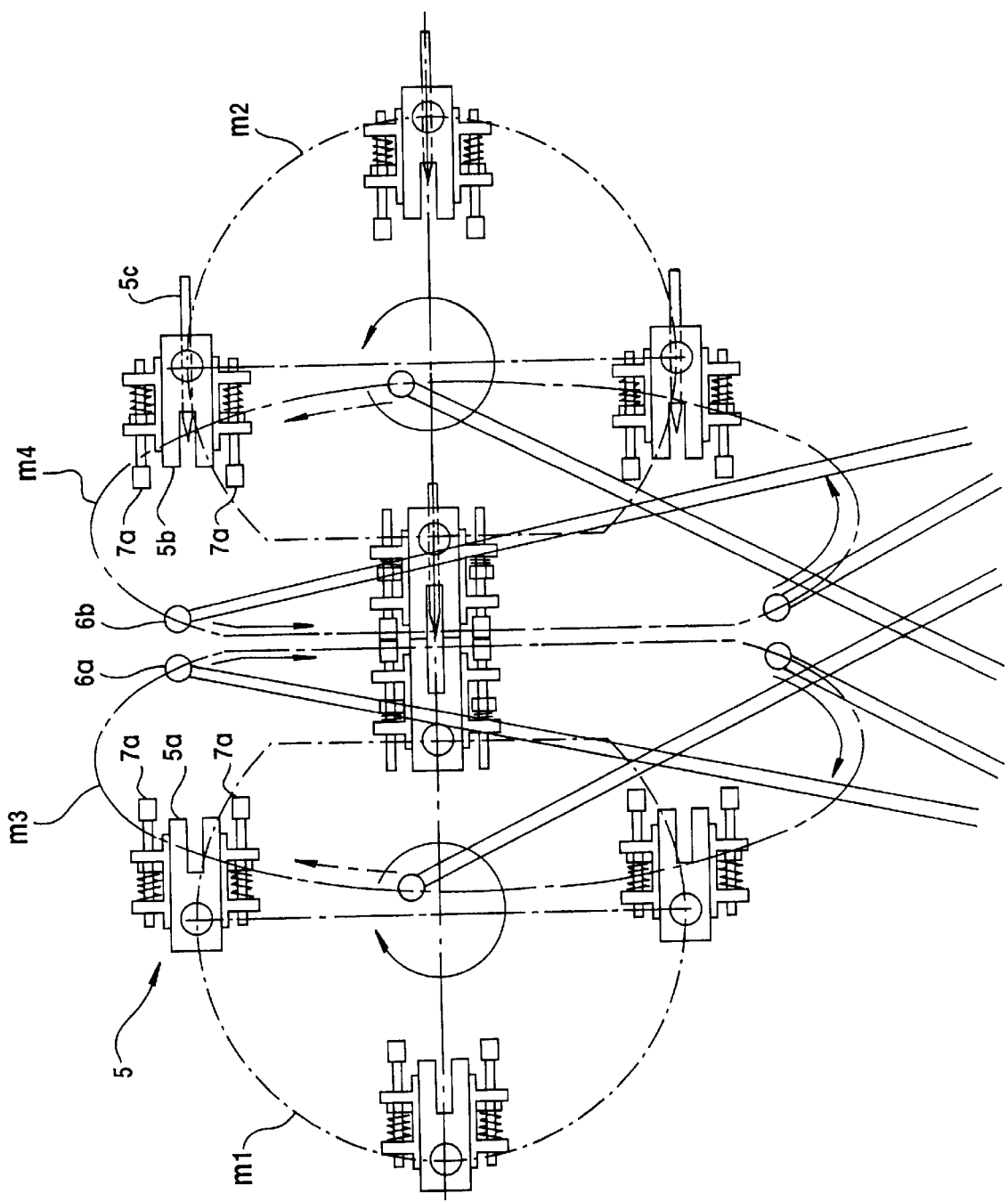
FIG. 19 is an explanatory diagram showing an example of a product biting preventive device in the longitudinal type bag forming, filling and packaging machine provided with the box-motion type end-sealing/cutting device, to which the present invention is applied.
Figure 20A:
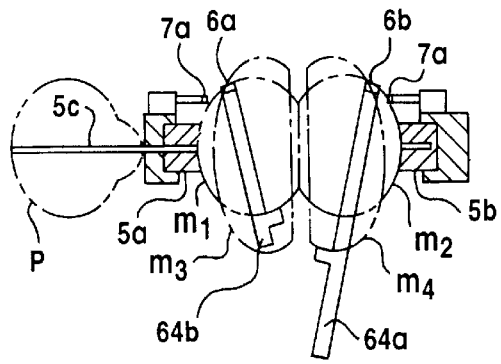
FIG. 20 is a process diagram showing associated operation of the end-sealing/cutting device and a packaging cylinder flattening device in the longitudinal type bag forming, filling and packaging machine shown in FIG. 19.
Figure 20B:
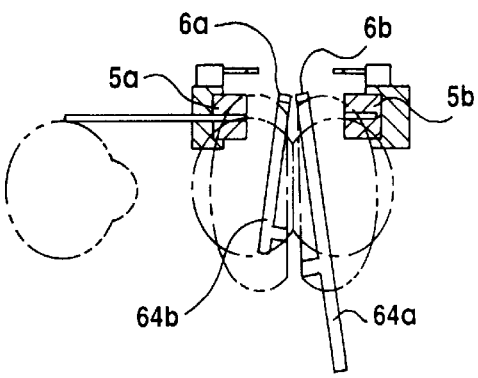
Figure 20C:
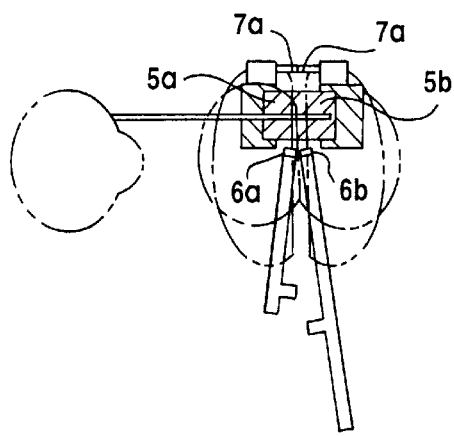
Figure 20D:
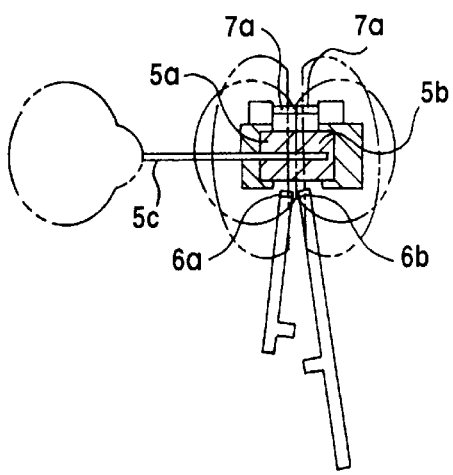
Figure 20E:
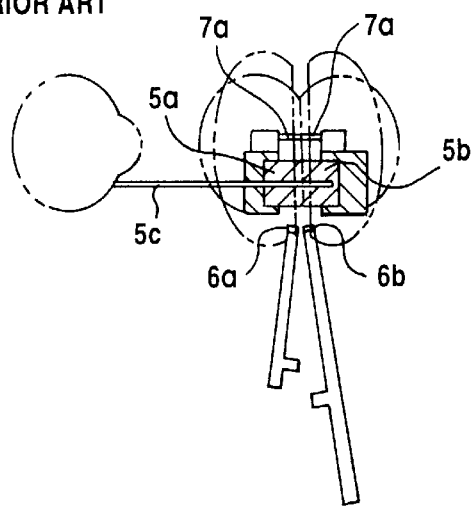
Figure 20F:
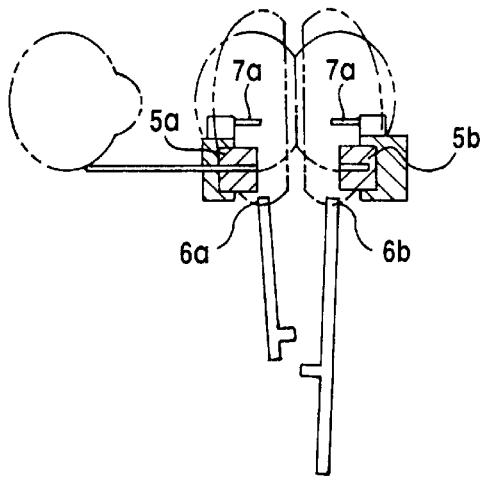

FIG. 18 shows a state in which the end-sealing heaters 5*a* and 5*b* reach the points I to be open at maximum.

In short, this product biting preventive method for the end-sealing heaters is as follows: The curved cam lines m1 and m2 apply such a box motion to the end-sealing heaters 5*a* and 5*b* that the end-sealing heaters 5*a* and 5*b* approach each other from the most ascending positions and the opened state, are moved downwardly over the predetermined distance while maintaining the closed state with the constant clearance after the end-sealing heaters 5*a* and 5*b* are closed to each other with the constant clearance, approach each other to be further closed to apply the end-sealing, and then are returningly moved upwardly so as not to interference with the product to be packaged. By simply holding the pair of the opposing stripping plates 6*a* and 6*b* elastically on the lower sides of the respective end-sealing heaters 5*a* and 5*b* so that the stripping plates 6*a* and 6*b* are protruded toward each other from the respective end-sealing heaters 5*a* and 5*b*, the box motion of the end-sealing heaters 5*a* and 5*b* causes the pair of the stripping plates 6*a* and 6*b* to be moved downwardly while maintaining the closed state. The film feeding of the film feeding device 4 and the box motion of the end-sealing/cutting device 5 are speed-changed as desired through the servo-motors 8*a* and 8*b* so that the descending speed of the stripping plates 6*a* and 6*b* is made larger than the descending speed of the packaging cylinder H during the time when the stripping plates 6*a* and 6*b* are closed at predetermined positions upper than the cut position C of the packaging cylinder H, the cutter 5*c* is in alignment with the cut position C of the packaging cylinder H and then the end-sealing heaters 5*a* and 5*b* are closed, thereby effecting the stripping action that the stripping plates 6*a* and 6*b* are moved downwardly while flattening the packaging cylinder H.

Next, a variable control for the end-sealing time period according to the present invention will be described.

Figure 22:
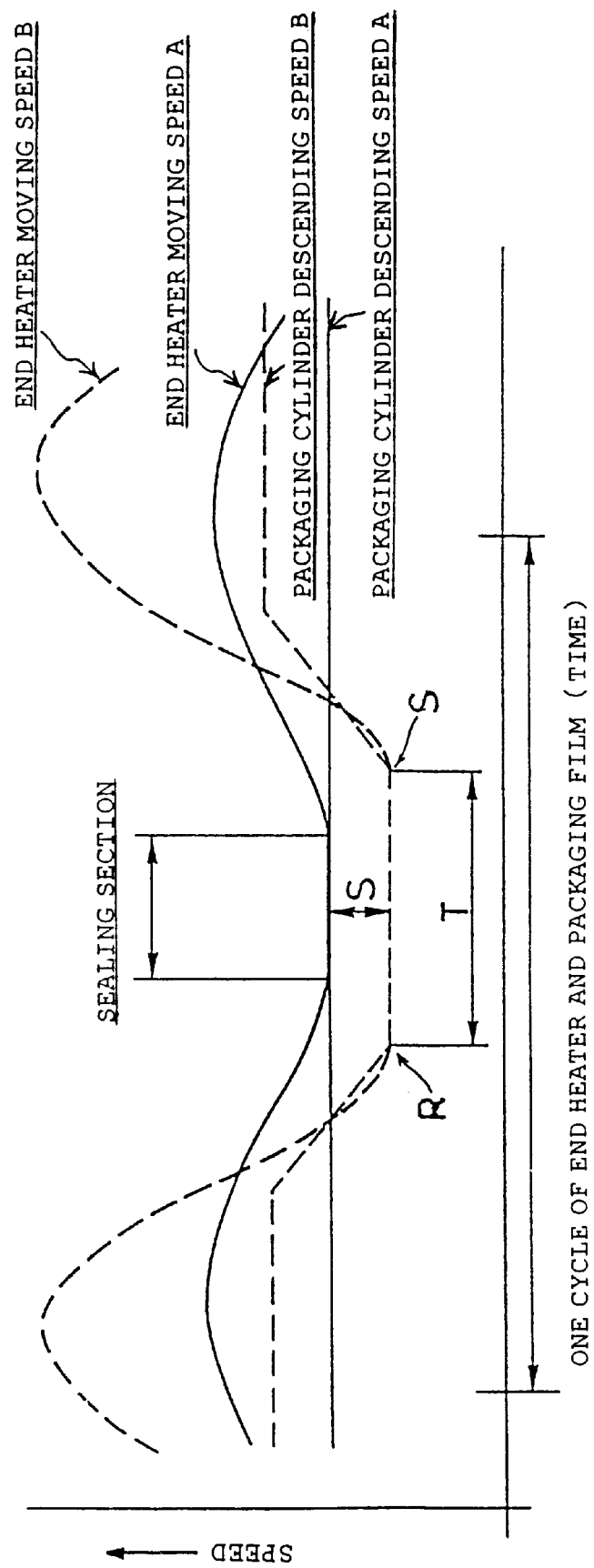
FIG. 22 is an explanatory view (No. 1) for a variable control of an end-sealing time period in the longitudinal type bag forming, filling and packaging machine provided with the box-motion type end-sealing/cutting device shown in FIG. 19.

FIG. 22 is an explanatory diagram of the variable control for the end-sealing time period according to the present invention, relating to the bag forming, filling and packaging machine which is integrated with the end-sealing device and which is not subject to the stripping control. In the figure, the solid lines indicate the end heater moving speed A and the packaging cylinder descending speed A in a case where the variable control is not applied. In this case, the packaging cylinder descending speed is constant. This speed is made (the product of the length of the bag)×(the rotation number). The end heater moving speed is made equal to the packaging cylinder descending speed during the sealing section, and increased or decreased depending on the needs outside the sealing section. FIG. 22 shows the speed-increased case, and the speed-increased case is a case in which the circumferential length of the circle of the cam shown in FIG. 21 is smaller than the length of the bag, whereas the speed-decreased case is a case in which the circumferential length of the circle of the cam is larger than the length of the bag. If the circumferential length of the circle of the cam is equal to the length of the cam, the heaters are moved at a constant speed.

In FIG. 22, broken lines indicate the end heater moving speed B and the packaging cylinder descending speed B in which the variable control for the end sealing according to the present invention is applied. As is clear from the figure, in the present invention, the descending speed during the sealing section is relatively lowered so that the sealing time period in a predetermined distance is elongated. To make the total time period of one cycle constant, the returning section outside the sealing section is speed-increased relatively. In the figure, the reference numeral S denotes an amount of the speed-reduction when the variable control is applied. The speed-reduction reduces the amount of movement per unit time, and thus can elongate the time period of the sealing section.

Figure 23:
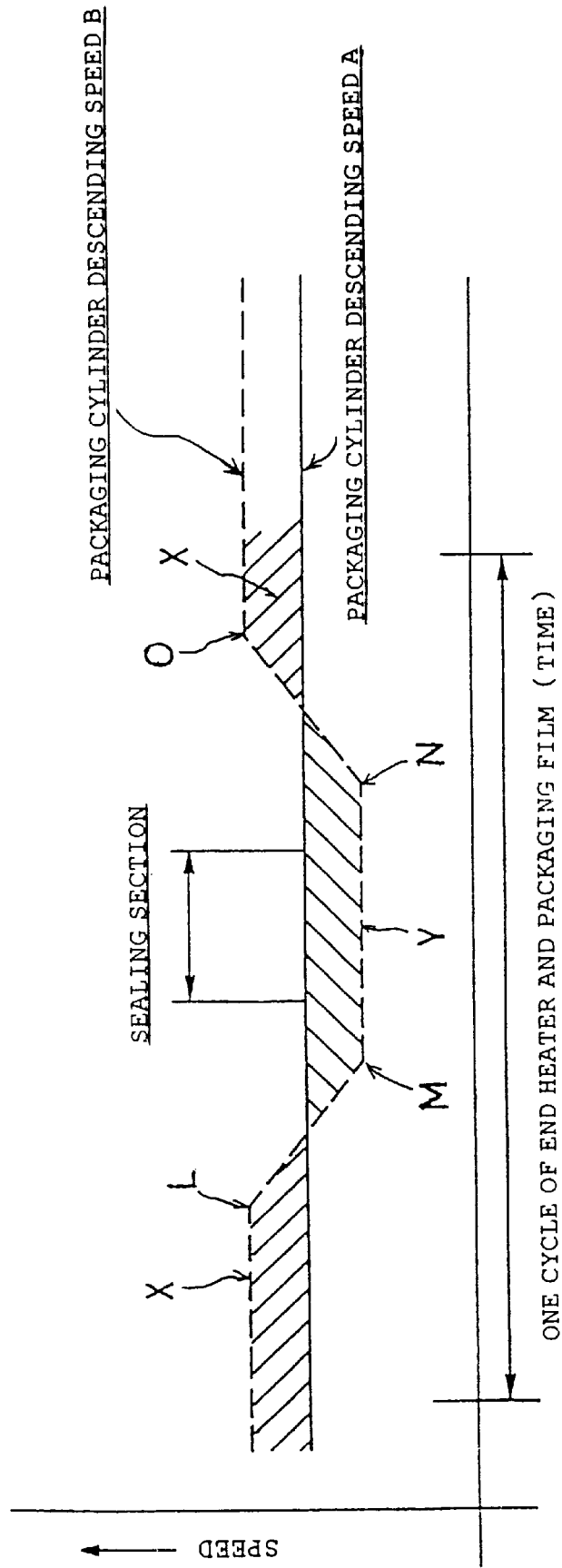
FIG. 23 is an explanatory view (No. 2) for a variable control of an end-sealing time period in the longitudinal type bag forming, filling and packaging machine provided with the box-motion type end-sealing/cutting device shown in FIG. 19.

FIG. 23 shows only the packaging cylinder descending speed when the variable control for the end sealing time period is applied. As described above, a predetermined speed after speed reduction is set for the sealing section, but the mere speed reduction results in the lack of the necessary moving amount for one cycle and thus it is required to supplement insufficiency by the speed increase at any position in the one cycle. For this reason, as shown in the figure, the reduced moving amount (hatched portion) Y is supplemented by the hatched portions X. The area of the hatched portion Y is equal to the area of the hatched portions X. The movement of the end heaters are supplemented similarly. Although the descending speed of the packaging cylinder is increased and decreased linearly and made constant in the figure, the descending speed may be varied to depict a sine curve similarly to the end heater moving speed. In the embodiment of the present invention, the linear control as shown in the figure is adopted since the film can be stably fed.

Figure 24:
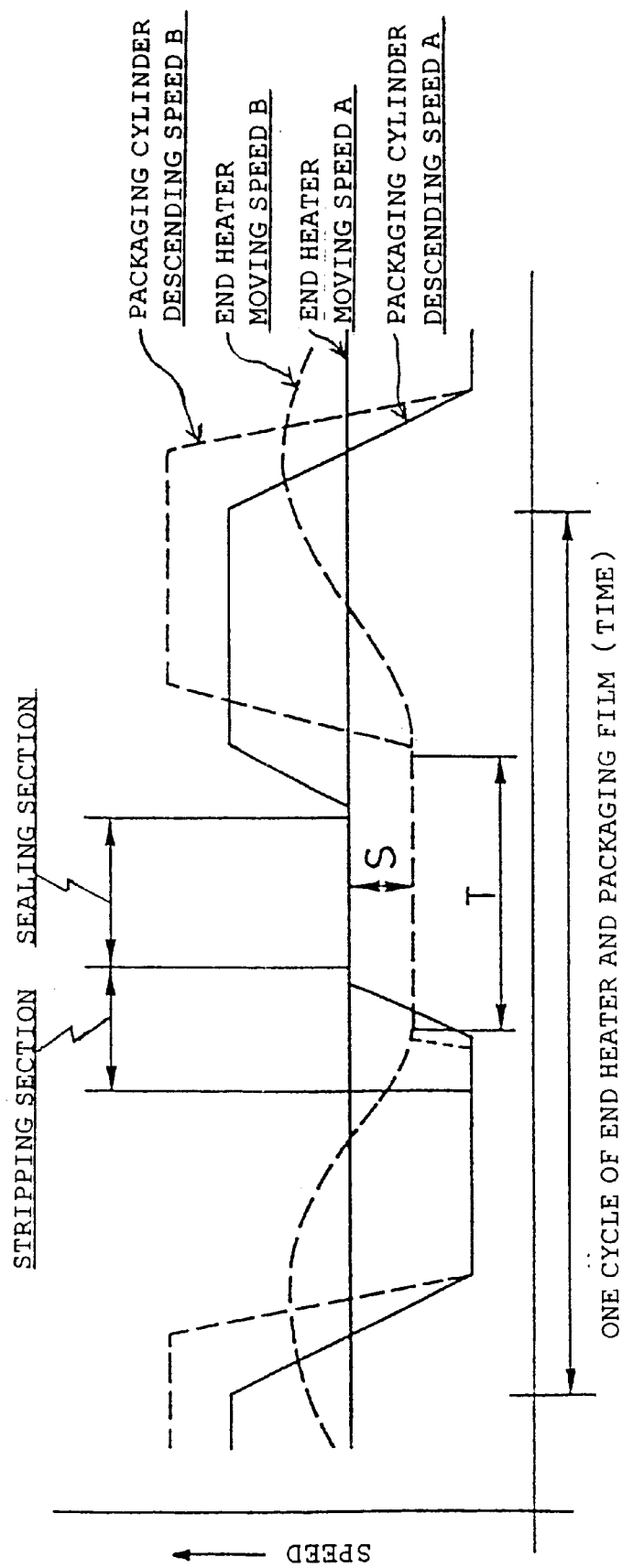
FIG. 24 is an explanatory view (No. 1) for a variable control of an end-sealing time period in the longitudinal type bag forming, filling and packaging machine provided with the box-motion type end-sealing/cutting device shown in FIG. 2.
Figure 25:
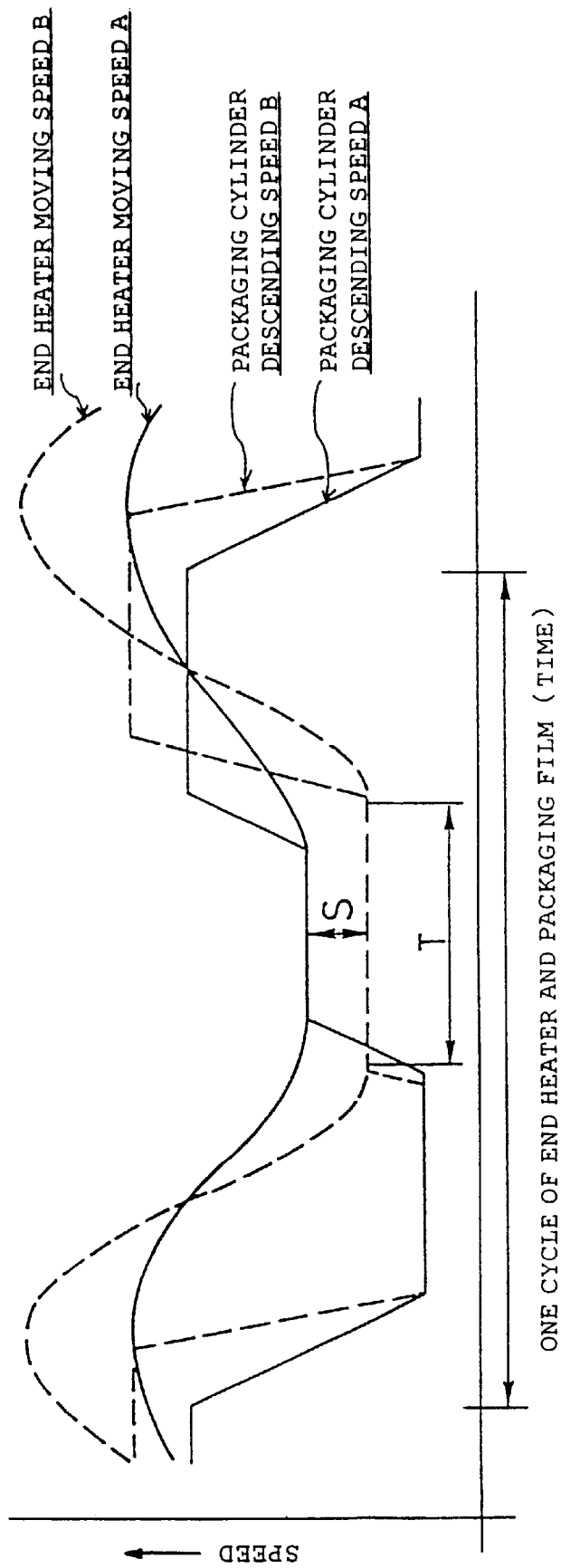
FIG. 25 is an explanatory view (No. 2) for a variable control of an end-sealing time period in the longitudinal type bag forming, filling and packaging machine provided with the box-motion type end-sealing/cutting device shown in FIG. 2.
Figure 26:
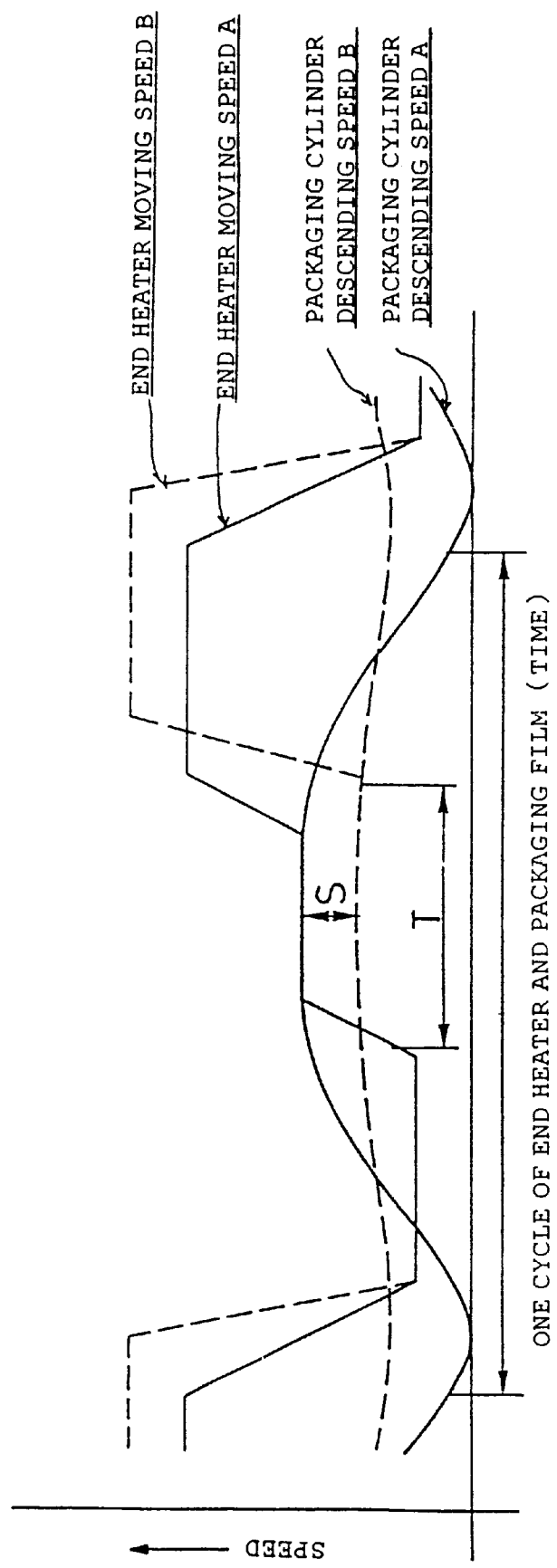
FIG. 26 is an explanatory view (No. 3) for a variable control of an end-sealing time period in the longitudinal type bag forming, filling and packaging machine provided with the box-motion type end-sealing/cutting device shown in FIG. 2.

FIGS. 24 to 26 are explanatory diagrams in which the variable control for the end-sealing time period according to the present invention is applied to the bag forming, filling and packaging machine that is integrated with the end-sealing device and that is subjected to the stripping control as shown in FIGS. 2 to 18. In the figures, the solid lines indicate the end heater moving speed A and the packaging cylinder descending speed A in a case where the variable control for the end-sealing is not applied, and broken lines indicate the end heater moving speed B and the packaging cylinder descending speed B in a case where the variable control for the end-sealing according to the present invention is applied. FIG. 24 shows the case where the circumferential length of the circle of the cam is equal to the length of the bag, FIG. 25 shows the case where the circumferential length of the circle of the cam is smaller than the length of the bag, and FIG. 26 shows the case where the circumferential length of the circle of the cam is larger than the length of the bag.

Similarly to FIG. 22, in the present invention, the descending speed is made relatively lowered than the conventional one during the sealing section so that the sealing time period in the predetermined distance is elongated. FIGS. 24 to 26 are also similar to the FIG. 22 on the point where the speed is relatively increased during the returning section outside the sealing section to make the total time period of the one cycle unchanged. In the figures, reference numeral S denotes the amount of the speed reduction when the variable control for the time period is applied. The speed reduction reduces the amount of the movement per unit time, and thus can elongate the time period of the sealing section.

A difference from FIG. 22 is that the speed-change section for executing the stripping (the stripping section in FIG. 24) exists. In FIGS. 22 to 24, the solid lines describe the end heater moving speed A and the packaging cylinder descending speed A in the case where the variable control for the end sealing is not applied, and as shown by the solid lines. a preliminary speed reduction is carried out for the stripping action (see, for instance, VL in FIG. 6). The end heater moving speed B and the packaging cylinder descending speed B are increased and decreased as indicated by the broken lines so as not to adversely affect the speed change points during the speed reduction section for the stripping action.

As described above, the present invention uses the characteristic of the servo-motor in which the speed change, acceleration, stop and so on can be controlled in a desired manner, and the constant speed rotation of the swinging levers 17a, 17b, 18a and 18b shown in FIG. 4 in the conventional machine is replaced with such servo-motor-controlled rotation that the rotation is speed-decreased during a portion corresponding to the sealing section and speed-increased during a portion corresponding the returning section of the box motion, thereby increasing a ratio of the sealing time period relative to one cycle.

Here, a specific embodiment of the sealing time period control will be explained by describing the box motion type bag forming and filling machine using a standard cam shown in FIG. 21(b) as an example.

Figure 27:
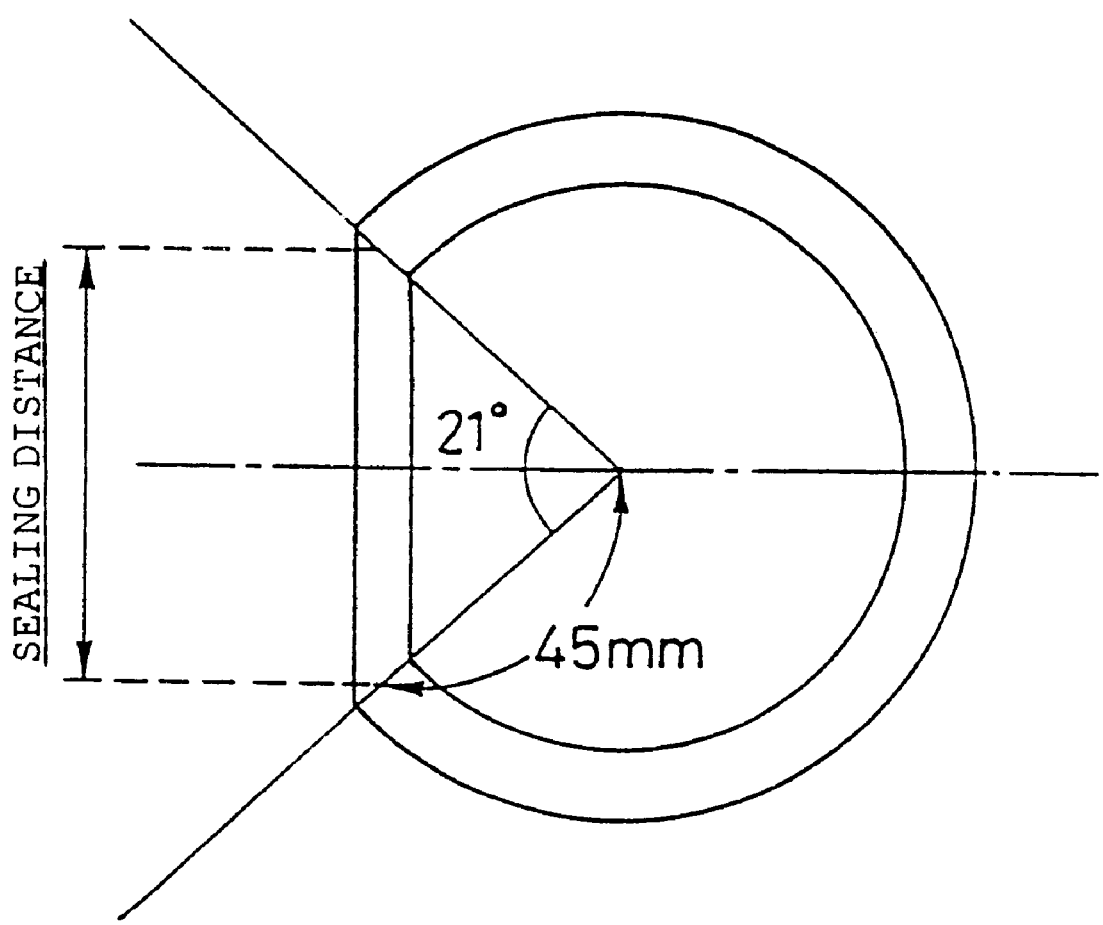
FIG. 27 shows a standard restricting cam used in the longitudinal bag forming, filling and packaging machine provided with the box motion type end-sealing/cutting device.

FIG. 27 shows an example of the standard cam (a restricting cam for an end sealer). Although several kinds of cam configurations exist, shown in the figure is one that has an angle of 21 degree. As described above, by the restriction of the cam, a linear distance to be sealed is determined to be:

45 mm×(SIN 21 degree/2)×2=16.40 mm.

The sealing time period is determined in accordance with the packaging capability of the bag forming and filling machine and the length of the bag. For example, if the packaging capability is 100 times/minute, and the length of the bag is 200 mm, then the time period for one cycle is determined to be:

60/100=0.6 second.

Therefore, the sealing time period is:

0.6×16.40/200=0.0492 second (49.2 msec.).

Figure 28:
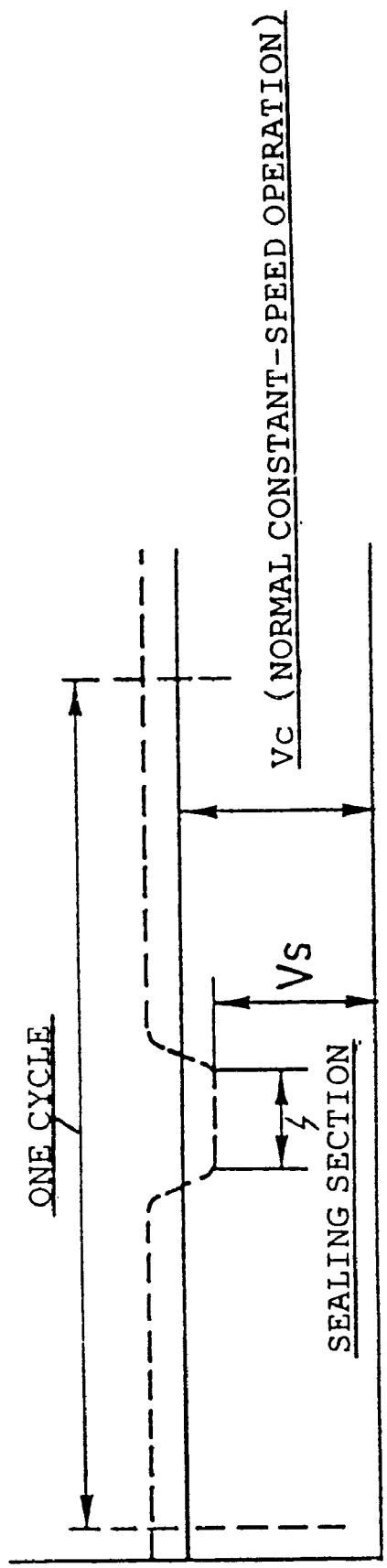
FIG. 28 is a schematic view showing sealing sections in one cycle.

FIG. 28 schematically shows the sealing section in one cycle. In the figure, the solid line indicates the conventional one, and the broken line indicates the controlled example of the present invention. The cycle speed (Vc) is the constant packaging cylinder descending speed in the conventional one, whereas in case of the example of the present invention, the speed is made constant outside the sealing section and the speed is made lower than the normal speed during the sealing section. In this case, the followings stand:

cycle speed Vc=length of bag×rotation number where rotation number=packaging capability (times/minute); and sealing speed Vs=cycle speed Vc×level (from 0 to 99)/(99×2).

By changing the level appropriately, the sealing time period can be elongated. The width of variation is from 49.2 to 98.4 msec. (variable by a step of 0.49 msec.).

In addition, depending on the length of the bag and the rotation number, the width in which the sealing time period can be varied, and the amount of the variable step are changed. The time period width under the above-noted condition is determined by the mechanical condition and the capability of the servo-motor, but it may be widened depending on conditions.

Figure 29:
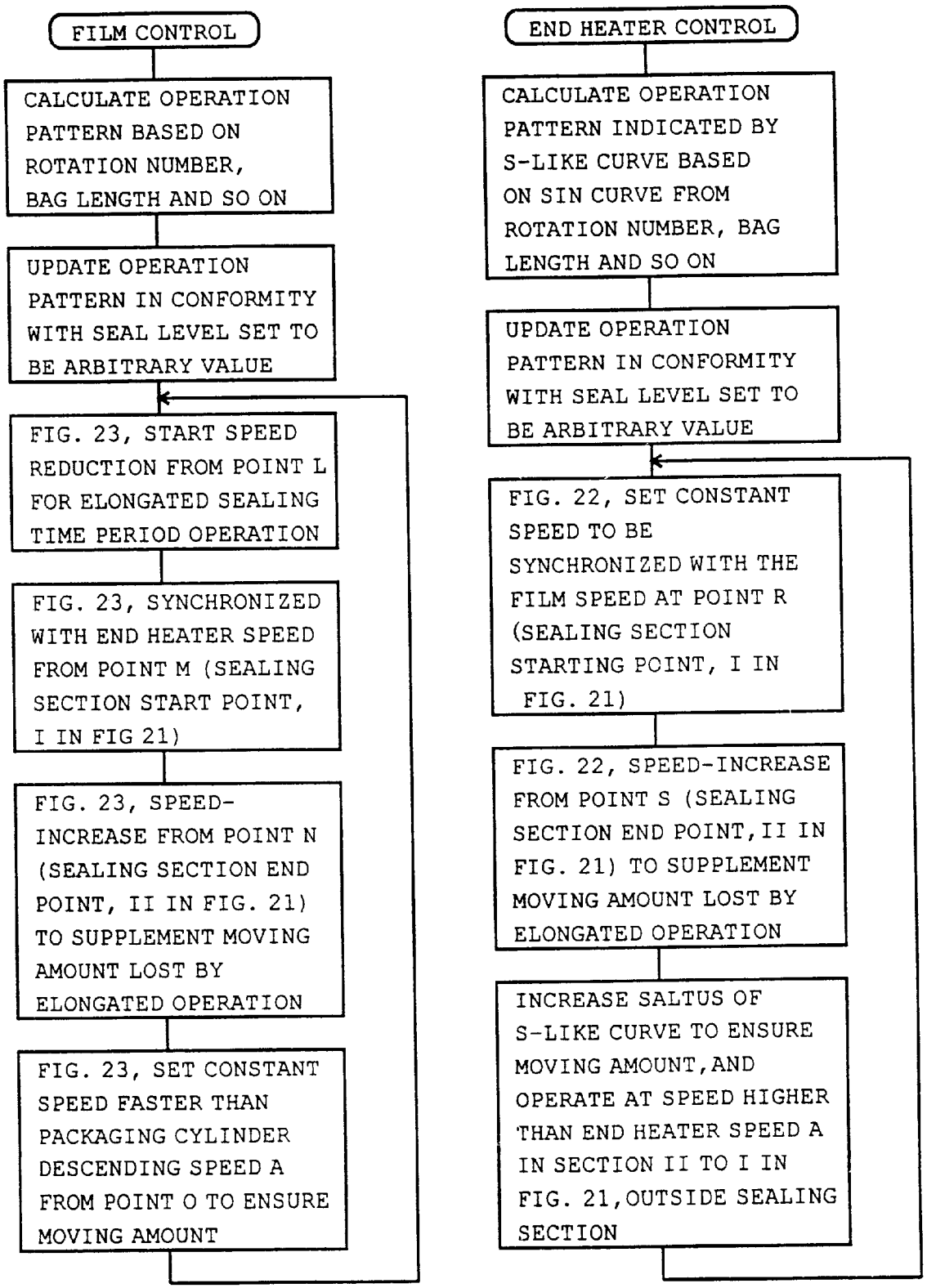
FIG. 29 is a flow-chart showing the operation of the sealing time period control.

A series of these operations are shown in FIG. 29.

As described above, according to the present invention, in the box-motion type bag forming and filling machine, by controlling the servo-motors appropriately, the sealing time period in one cycle can be elongated. Since the time period used for the sealing in the same stroke is increased, more secure sealing can be achieved in comparison to the conventional one. Further, assuming that the sealing time period is not changed, the descending speed of the packaging cylinder is increased to obtain the same sealing strength. That is, such an advantage may be realized that the productivity can be enhanced.

What is claimed is:

1. A method of controlling an end-sealing time period for a bag forming, filling and packaging machine, comprising:

longitudinally sealing a packaging film at its both film edges to provide a packaging cylinder, feeding said packaging cylinder downwardly with a film feeding device at a speed determined by a packaging capacity of the machine, sealing said packaging cylinder at two-lateral rows, and cutting an intermediate position between said rows with a box-motion end-sealing/cutting device, one row being located at an upper side of a product to be packaged that is filled into said packaging cylinder, and the other row being located at a lower side of a product to be packaged that is to be filled into said packaging cylinder subsequently, wherein said end-sealing/cutting device is moved successively along (i) an end-sealing section from an end-sealing starting position to an end-sealing completed position during a sealing time period, and (ii) a returning section from the end-sealing completed position to the end-sealing starting position during a returning time period, so as to form a box motion, and controlling servo-motors for forming said box motion so as to shorten the returning time period and to decrease a descending speed of said packaging cylinder and a descending speed of said end-sealing/cutting device simultaneously in the end-sealing section of a constant length determined by a rotation angle of cams for forming said box motion for the sealing section so as to elongate the end-sealing time period without changing the speed determined by the packaging capacity of the machine.

2. A method of controlling an end-sealing time period for a bag forming, filling and packaging machine according to claim 1, comprising:

rotating cams for forming said box motion at a lower speed in said end-sealing section, and at a higher speed outside said end-sealing section.

3. A method of controlling an end-sealing time period for a bag forming, filling and packaging machine according to claim 1 or 2, said bag forming, filling and packaging machine being arranged such that end-sealing/cutting device is integrated with stripping plates, comprising:

carrying out speed-increase and speed-decrease to elongate said end-sealing time period without adversely affecting a speed change point in a speed-reduction section of said end-sealing/cutting device for a stripping action by stroking the film downward for the product inside to drop deeper downward toward the bottom of the bag being formed.

4. A method of controlling an end-sealing time period for a bag forming, filling and packaging a machine according to claim 1, comprising:

controlling servo-motors for forming said box motion so as to shorten the returning time period and to decrease a descending speed of said packaging cylinder and a descending speed of said end-sealing/cutting device simultaneously in the end-sealing section so as to elongate the end-sealing time period by changing the descending speed slower than that of the case where the length of the circumference of a circle of the cam is equal to the longitudinal length of the bag and the cams always rotate at a constant speed.

5. A method of controlling an end-sealing time period for a bag forming, filling and packaging machine according to claim 4, comprising:

controlling servo-motors for forming said box motion so as to shorten the returning time period still more in the case where the length of the circumference of a circle of the cam is shorter than the longitudinal length of the bag so as to coincide a total period with one cycle time.

6. A method of controlling an end-sealing time period for a bag forming, filling and packaging machine according to claim 4, comprising:

controlling servo-motors for forming said box motion so as to shorten the returning time period at a slower speed in the case where the length of the circumference of a circle of the cam is longer than the longitudinal length of the bag so as to coincide a total period with one cycle time.

* * * * *